(12) United States Patent
Cvek

(10) Patent No.: US 11,696,639 B2
(45) Date of Patent: Jul. 11, 2023

(54) WIRE MANAGEMENT SYSTEMS AND METHODS

(71) Applicant: Sava Cvek, Jamaica Plain, MA (US)

(72) Inventor: Sava Cvek, Jamaica Plain, MA (US)

(*) Notice: Subject to any disclaimer, the term of this patent is extended or adjusted under 35 U.S.C. 154(b) by 340 days.

(21) Appl. No.: 16/874,545

(22) Filed: May 14, 2020

(65) Prior Publication Data

US 2020/0390237 A1    Dec. 17, 2020

Related U.S. Application Data

(60) Provisional application No. 62/847,645, filed on May 14, 2019.

(51) Int. Cl.

| | |
|---|---|
| *F16L 3/00* | (2006.01) |
| *A47B 21/06* | (2006.01) |
| *H02G 3/04* | (2006.01) |
| *F16L 3/26* | (2006.01) |
| *F16B 2/22* | (2006.01) |
| *H01R 13/73* | (2006.01) |
| *F16L 3/14* | (2006.01) |
| *H01R 25/00* | (2006.01) |

(52) U.S. Cl.
CPC ............... *A47B 21/06* (2013.01); *F16B 2/22* (2013.01); *F16L 3/14* (2013.01); *F16L 3/26* (2013.01); *H01R 13/73* (2013.01); *H02G 3/0437* (2013.01); *A47B 2021/064* (2013.01); *A47B 2021/066* (2013.01); *H01R 25/003* (2013.01)

(58) Field of Classification Search
None
See application file for complete search history.

(56) References Cited

U.S. PATENT DOCUMENTS

| | | | |
|---|---|---|---|
| 5,231,562 A | 7/1993 | Pierce et al. | |
| 5,971,508 A * | 10/1999 | Deimen | A47B 97/00 108/50.02 |
| 5,971,509 A * | 10/1999 | Deimen | H02G 3/0437 108/26 |
| 6,254,206 B1 | 7/2001 | Petrick et al. | |
| 6,410,855 B1 | 6/2002 | Berkowitz et al. | |

(Continued)

FOREIGN PATENT DOCUMENTS

AU    2011201001 B2    9/2011

*Primary Examiner* — Steven M Marsh
(74) *Attorney, Agent, or Firm* — Thomas P. O'Connell; O'Connell Law Firm

(57) ABSTRACT

A wire management system for managing electronic wiring in relation to a structure. An elongate mounting track has a spine and locking ribs forming first and second longitudinal locking formations, and a wire management cradle has a panel of mesh forming a central cradle section and first and second attachment sections with receiving channels forming first and second longitudinal locking formations for being selectively attached to the first and second longitudinal locking formations of the mounting track. A proximal portion of one of the attachment sections can be divided into plural segments separated by openings to allow the passage of wires. An accessory rail can selectively and adjustably retain accessories, including wire management clips and power units. The wire management clip and other accessories have retaining formation corresponding in shape to the shape of a retaining formation of the accessory rail.

20 Claims, 21 Drawing Sheets

(56) References Cited

U.S. PATENT DOCUMENTS

| | | | |
|---|---|---|---|
| 6,448,498 B1 | 9/2002 | King et al. | |
| 6,903,266 B1 | 6/2005 | Luciere | |
| 7,612,300 B2 * | 11/2009 | Owens | G02B 6/4459 |
| | | | 174/72 A |
| 9,345,319 B1 * | 5/2016 | Heuel | A47B 97/00 |
| 10,575,632 B2 | 3/2020 | Yoo et al. | |
| 2003/0089515 A1 * | 5/2003 | Federspiel | H02G 3/0437 |
| | | | 174/480 |
| 2004/0149177 A1 * | 8/2004 | Gayhart | A47B 21/06 |
| | | | 108/50.02 |
| 2011/0036276 A1 | 2/2011 | Petrick et al. | |
| 2012/0286110 A1 * | 11/2012 | Hill | F16L 3/26 |
| | | | 248/74.2 |
| 2015/0282612 A1 | 10/2015 | Rutz | |
| 2020/0014181 A1 * | 1/2020 | Faith | H02G 3/0418 |

* cited by examiner

WIRE MANAGEMENT SYSTEMS AND METHODS

RELATED APPLICATION

This application claims priority to U.S. Provisional Patent Application No. 62/847,645, filed May 14, 2019, which is incorporated herein by reference.

FIELD OF THE INVENTION

The present invention relates generally to wire management. More particularly, disclosed herein are systems and methods for versatile and multi-functional wire management in relation to desks and other structures.

BACKGROUND OF THE INVENTION

The modern work surface commonly provides simultaneous support not only to a personal computer system but also to plural other electronic devices, including mobile and landline telephones, computer tablets, desk lights, and still other components. Wires and cables must travel to and between the electronic components to provide the required power and data connections. For instance, the typical personal computer relies on a main processor, a monitor, speakers, and input devices, all separate from the main processor. A printer, external memory, and possibly other peripherals also may be connected to the main processor requiring still further power and data connections.

The many cables required to power and interconnect the electronics of the typical work surface thus inherently present an organizational challenge. Furthermore, with the multiple electronic devices spread across the work surface and beyond, the multiplicity of wires required to power and connect them must be caused to follow different and variable paths so that arranging the wires in an orderly manner is rendered still more difficult. That organizational challenge can be multiplied where plural computer systems are disposed in a given work area, such as is the case in certain academic and office settings.

The result is often an unattractive, disorderly nest of wires traveling from the power source to the several electronic devices and traveling from device to device. In the end, power and data cables may simply be allowed to hang over the back edge of the table or desk. Over time, cords and cables can become further disorganized and tangled and, in some situations, can create safety hazards for persons attempting to maneuver within the workspace.

Even apart from the organizational issues presented by a given wiring configuration, it will be understood that a given user's electronic needs and positioning requirements may change over time or based on the task at hand. Furthermore, different users of the same workspace may have different electronic requirements and different needs or preferences with respect to positioning. However, repositioning electronics and the wiring for the same under the typical configurations of the prior art can be exceedingly difficult and contributes to further disorganization.

Beyond the foregoing, it is recognized that users commonly need to connect and disconnect certain electronic devices from their power supplies or data connections repeatedly. For instance, mobile telephone and tablet owners often connect and reconnect the devices for power and data communication daily or even plural times in a given day. Disadvantageously, with the ends of the needed cords retained in a disorganized manner or not at all, phone and tablet users often find themselves forced to track down and retrieve the elusive power and data cords again and again.

In view of the plurality of electronic devices that are retained on and within the typical desk structure and the need to organize, add to, subtract from, adjust, and otherwise maintain the many wires that enable power and communication in relation to such electronic devices, it is apparent that there is a need for systems and methods that enable wire management in relation to desks and other structures retaining electronic devices in an effective and elegant manner.

SUMMARY OF THE INVENTION

The present invention is thus founded on the basic object of providing wire management systems and methods that permit the versatile and elegant retention of plural wires, plugs, and power supplies in relation to a structure, such as but not limited to a desk structure.

A more particular object of embodiments of the invention is to enable electronic power and communication wires, plugs, and power supplies to be efficiently retained while permitting the ready addition, removal, configuration, reconfiguration, and adjustment of wires and electronic devices in electrical communication therewith.

A further object of embodiments of the invention is to facilitate the flexible and selective disposition and routing of plural wires along variable and desired pathways.

Another object of particular embodiments of the invention is to enable the selective retention of power and communication wires, plugs, and power supplies in a convenient and adjustable manner.

An additional object of embodiments of the invention is to enable electronic power and communication wires, plugs, and power supplies to be retained in an aesthetically pleasing manner.

Another object of embodiments of the invention is to enable electronic power and communication wires, plugs, and power supplies to be routed, retained, and reconfigured without a need for specialized tools.

These and in all likelihood further objects and advantages of the present invention will become obvious not only to one who reviews the present specification and drawings but also to those who have an opportunity to make use of an embodiment of the wire management systems and methods disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In one embodiment of the wire management system for managing electronic wiring in relation to a structure, an elongate mounting track is provided for being mounted to the structure. The structure can, by way of example and not limitation, comprise a desk work surface. The mounting track has a spine and first and second longitudinal locking formations. A wire management cradle is provided that has a central cradle section and first and second longitudinal locking formations for being selectively attached to the first and second longitudinal locking formations of the mounting track. Under such embodiments, the wire management cradle can be selectively attached to the elongate mounting track to define an enclosure for electronic wiring.

In practices of the invention, each of the first and second locking formations of one of the mounting track and the wire management cradle comprises a longitudinal locking rib, and each of the first and second locking formations of the other of the mounting track and the wire management cradle comprises a longitudinal receiving channel for receiving the longitudinal locking rib. In such embodiments, each of the first and second locking formations comprising a locking rib can further comprise a locking stop that traverses longitudinally in spaced relation to the locking rib.

The locking ribs can be retained by longitudinal retaining walls that project from the spine of the mounting track and the locking stops can project from the spine spaced from the retaining walls such that locking channels are defined within areas between the retaining walls, the spine, the locking stops, and the locking ribs. In such embodiments, the receiving channels can be retained by the wire management cradle. Furthermore, longitudinal cantilever tip portions can project from the receiving channel, such as from a C-shaped wall defining the receiving channel. Under such constructions, the longitudinal cantilever tip portion can be received into the locking channel.

The central cradle section can be formed by a panel of flexible material, such as a panel of mesh, with first and second longitudinal edges. A first attachment section can be secured to the central cradle section along the first longitudinal edge thereof, and a second attachment section can be secured to the central cradle section along the second longitudinal edge thereof. In such embodiments, the first and second locking formations can then be retained by the first and second attachment sections. The first and second locking formations of the mounting track can comprise longitudinal locking ribs, and the first and second locking formations of the wire management cradle can then comprise longitudinal receiving channels for receiving the longitudinal locking ribs.

Where first and second attachment sections retain the central cradle section, each can have a proximal spline wall that projects from the locking formation and a distal spline wall that extends the proximal spline wall. The proximal spline wall and the distal spline walls can have different material properties, such as by having the proximal spline wall be of a given hardness and the distal spline wall being of a softer material amenable to being sewn to the central cradle section. In certain practices of the invention, the proximal spline wall and the distal spline wall could thus be formed through co-extrusion of a first material and a second, different material.

To facilitate versatility in the routing of electronic wiring and in the disposition of electronic components, at least one of the first and second attachment sections can have plural spaced openings. For example, where the first and second attachment sections comprise spline walls with the first and second locking formations retained along proximal edges of the spline walls, the locking formation and at least a portion of the spline wall can be divided into plural segments so that the plural segments can be selectively and individually attached to the mounting track.

Embodiments of the wire management system can further include an accessory rail retained by the mounting track. The accessory rail can have a longitudinal retaining formation for selectively retaining accessories with corresponding retaining formations. In certain practices of the invention, the spine can be considered to have an upper surface and a lower surface with the first and second longitudinal locking formations projecting from the lower surface of the spine and the accessory rail being upturned in relation to the upper surface of the spine. With that, the wire management system can be disposed with the spine mounted to a lower surface of a desk work surface and the accessory rail traversing in juxtaposition with an edge of the work surface.

Where the wire management system includes an accessory rail, a wire management clip can be provided with wire management clip having a retaining formation that corresponds in shape to the shape of the retaining formation of the accessory rail. For instance, the longitudinal retaining formation of the accessory rail can comprise a C-shaped formation, and the retaining formation of the wire management clip can then comprise a portion bounded by upper and lower laterally-communicating channels for engaging the C-shaped formation of the accessory rail. The wire management clip can thus be slidably engaged and selectively positioned with respect to the accessory rail. To facilitate the reception and retention of a wire, the wire management clip has a retaining channel. In certain embodiments, the wire management clip can have plural retaining channels for receiving and retaining plural wires.

Still further, embodiments of the wire management system can further comprise a power unit that has at least one electrical outlet. As used in this context, the electrical outlet could comprise a standard power outlet, a USB outlet, or any other electrical outlet. The power unit has a retaining formation that corresponds in shape to the shape of the retaining formation of the accessory rail. With that, the power unit can be selectively positioned and adjusted in position in relation to the accessory rail.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

Figure 1:
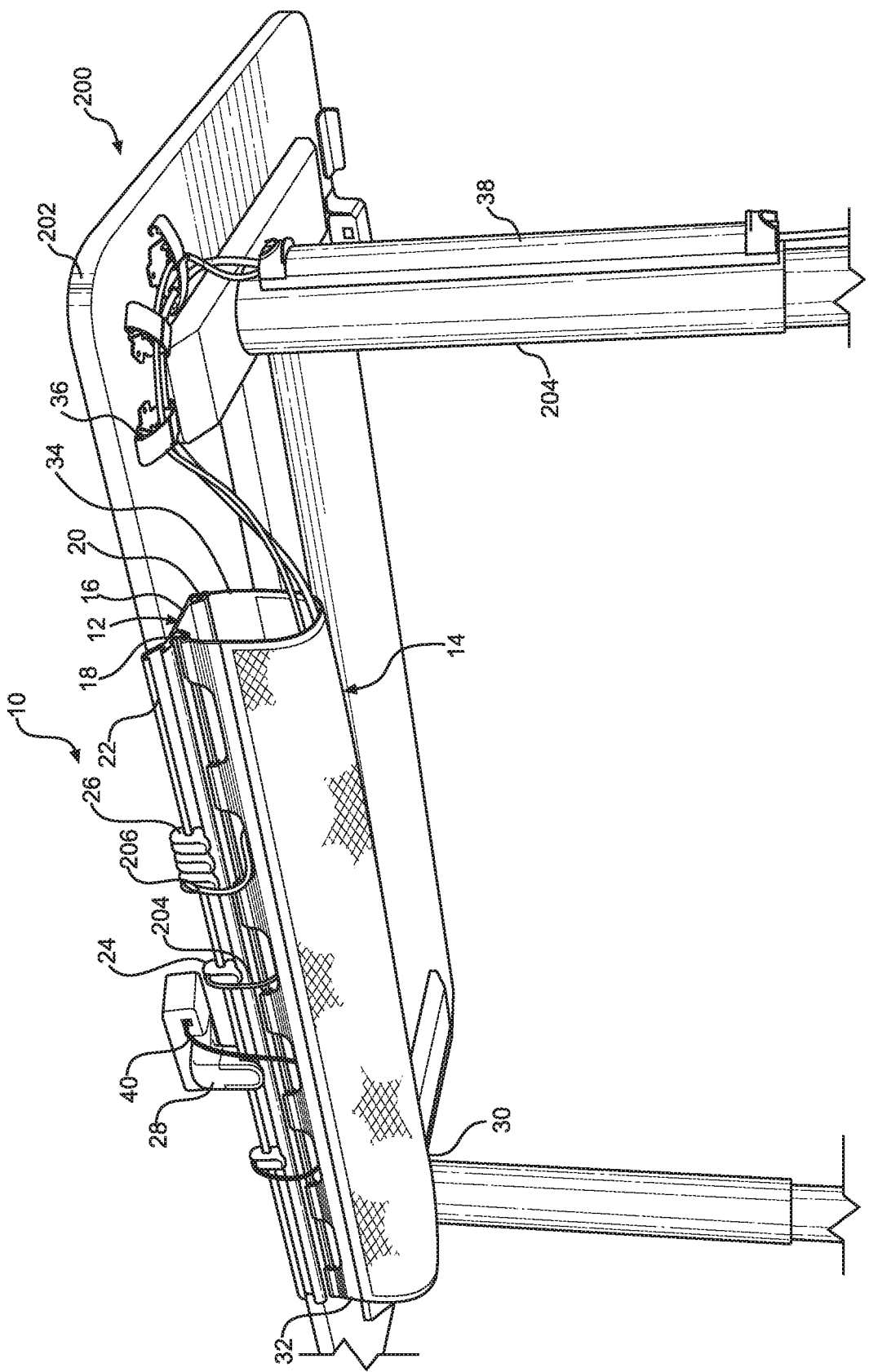
FIG. 1 is a perspective view of a wire management system according to the present invention shown mounted to a desk work surface.

The wire management systems and methods disclosed herein are subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

The wire management systems and methods disclosed herein may be employed to advantage relative to desk work surfaces and other furniture. However, it is to be understood that the wire management systems and methods could be employed in other applications within the scope of the invention except as it may be expressly limited by the claims. Before any particular embodiment of the invention is explained in detail, it must be made clear that the following details of construction and illustrations of inventive concepts are mere examples of the many possible manifestations of the invention.

Turning more particularly to the drawings, a wire management system according to the present invention is indicated generally at 10 in FIGS. 1 through 4. There, the wire management system 10 is mounted in relation to a desk work surface 200. While the wire management system 10 is advantageously used in relation to a desk work surface 200 with an upper platform 202 supported by left and right extendible legs 204 and is sometimes described as being mounted to such a desk work surface 200, it will be understood that the invention is not limited as to the type of desk 200 or indeed in any respect with regard to the structure relative to which it is mounted. The wire management system 10 can be employed in relation to pre-existing structures, or it can be incorporated upon initial manufacture. As disclosed herein, the wire management system 10 permits plural power and communication wires, plugs, and power supplies to be efficiently configured and retained along selected pathways and in selected locations in an elegant, convenient, and readily accessible and reconfigurable manner.

Figure 17:
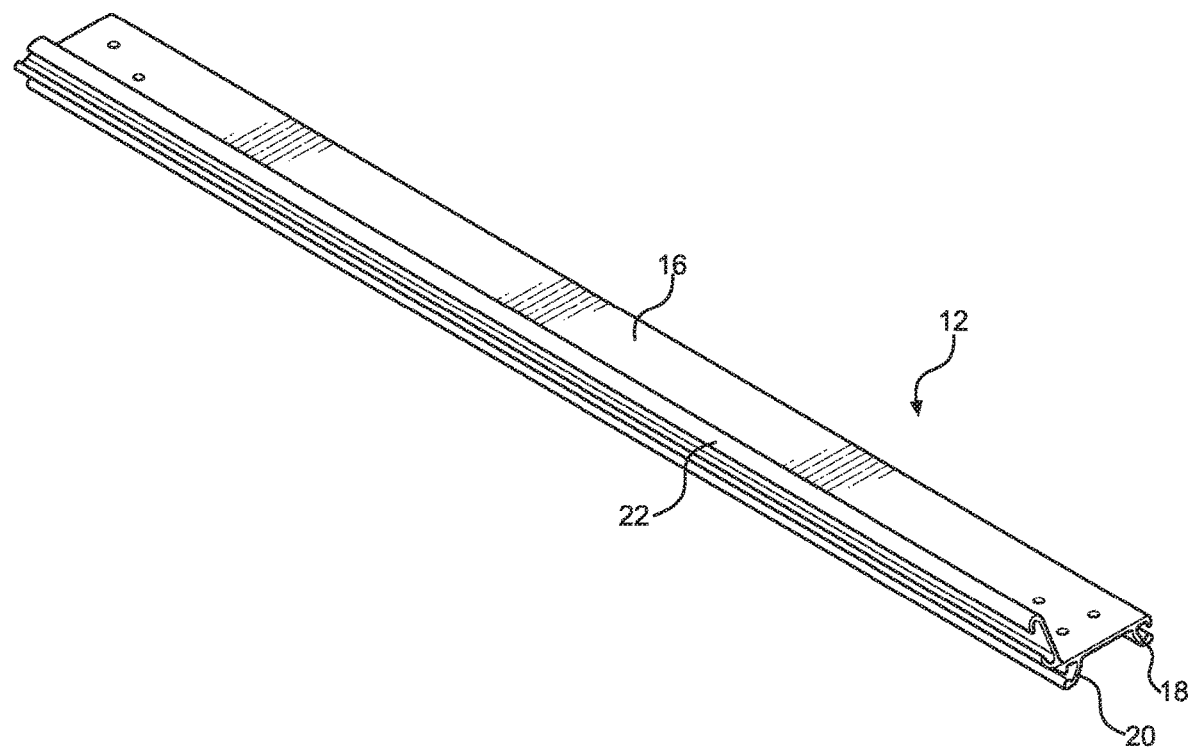
FIG. 17 is a perspective view of an alternative mounting track pursuant to the invention.

The wire management system 10 can be considered to be founded on an elongate mounting track 12. In use, the mounting track 12 is mounted in relation to the desk work surface 200 or other structure in any effective manner, such as by mechanical fasteners, by adhesive, or by any other method or combination thereof. The mounting track 12, embodiments of which can be seen apart in, for instance, FIGS. 5 and 17, has a longitudinal spine 16. First and second locking channels 18 and 20 of the mounting track 12 communicate longitudinally along first and second longitudinal sides of the spine 16. An accessory rail 22 of the mounting track 12 also communicates longitudinally along the second side of the spine 16 in parallel with the locking channels 18 and 20.

Figure 5:
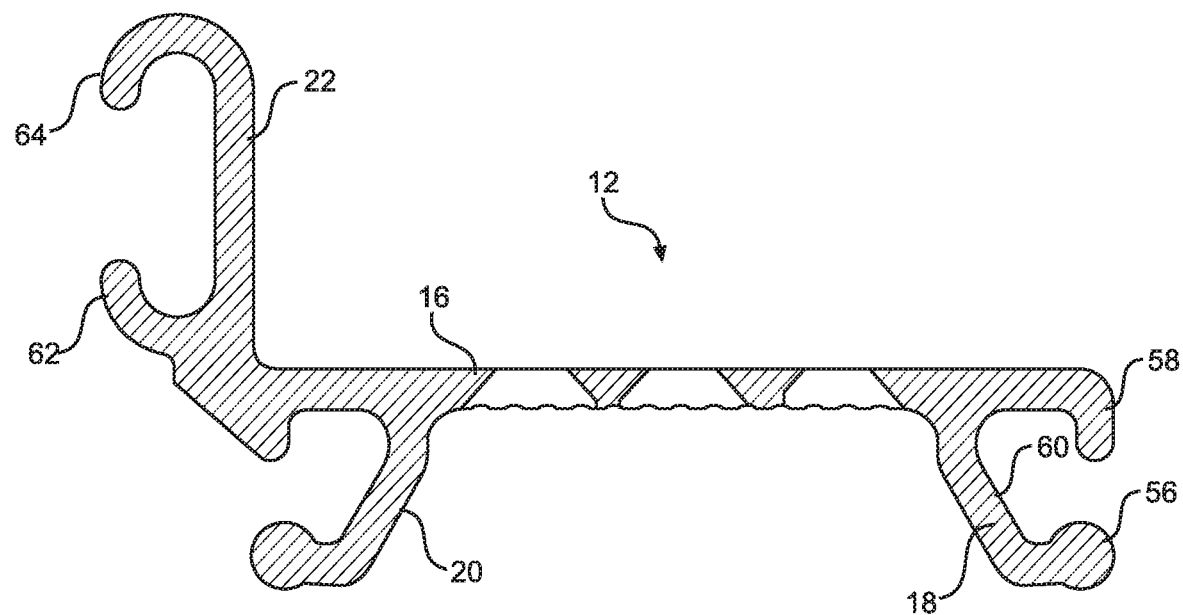
FIG. 5 is a cross-sectional view of a mounting track according to the invention.

In the present embodiment, the spine 16 can be considered to have an upper face and a lower face. The first and second locking channels 18 and 20 are disposed to the lower face side of the spine 16 while the accessory rail 22 is upturned in relation to the spine 16 to project beyond the upper face of the spine 16. For instance, the accessory rail 22 in the embodiment of FIG. 5 is generally orthogonal to the upper face of the spine 16 so that a rear wall of the accessory rail 22 and the upper face of the spine 16 define an L-shape. In other embodiments, as in FIG. 17, for example, the accessory rail 22 leans away from the upper face of the spine 16 to face at a downward angle in relation to the spine 16.

Again without limiting the application of the wire management system 10, the spine 16 can be secured to a platform 202 of a desk work surface 200, again by fasteners, adhesive, or any other mechanism or combination thereof, with the upper surface of the spine 16 in facing contact with the lower surface of the platform 202 and with the upstanding, longitudinally communicating accessory rail 22 in juxtaposition with an edge of the platform 202. For instance, as in FIGS. 1 through 4, the spine 16 can be disposed such that the accessory rail 22 and the first locking channel 18 traverses along a rear edge of the platform 202, and the second locking channel 20 traverses longitudinally in parallel with the rear edge of the platform 202 spaced inwardly by approximately the width of the spine 16.

Within the scope of the invention, the mounting track 12 could be formed in any effective manner. It would be possible, for instance, for the spine 16, the first and second locking channels 18 and 20, and the accessory rail 22 to be separately formed and joined, such as by welding, fasteners, adhesive, or in any other effective manner. In other embodiments, as is illustrated, the spine 16, the first and second locking channels 18 and 20, and the accessory rail 22 are unitarily formed, such as through an extrusion process. While the present invention is not limited as to any particular material or production process except as the claims might specify, embodiments of the mounting track 12 can, for instance be formed as an extrusion, such as an extrusion of aluminum or another suitable material.

With further reference to FIG. 5, each of the locking channels 18 and 20 are formed with a longitudinal locking rib 56. The locking rib 56 is retained at a distal end of a longitudinal retaining wall 60 that is outwardly angled in relation to the lower surface of the spine 16. A locking stop 58, which comprises in this embodiment a downturned ridge projecting from the spine 16, traverses longitudinally in spaced relation to the locking rib 56. The locking channels 18 and 20 are thus defined within the area between the retaining wall 60, the lower surface of the spine 16, the locking stop 58, and the locking rib 56.

Figure 2:
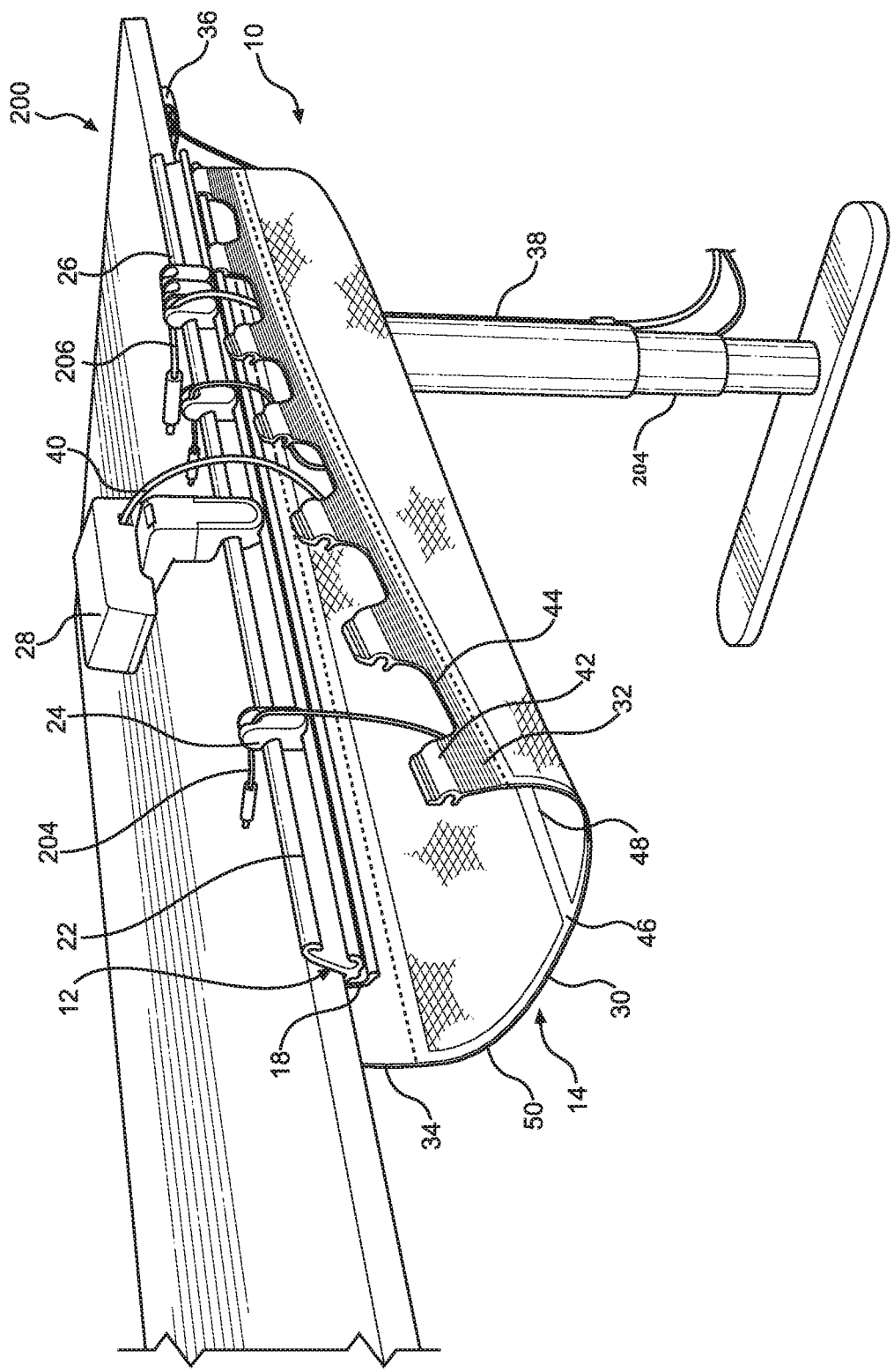
FIG. 2 is a perspective view of the wire management system in a partially opened configuration, again mounted to a desk work surface.
Figure 16:
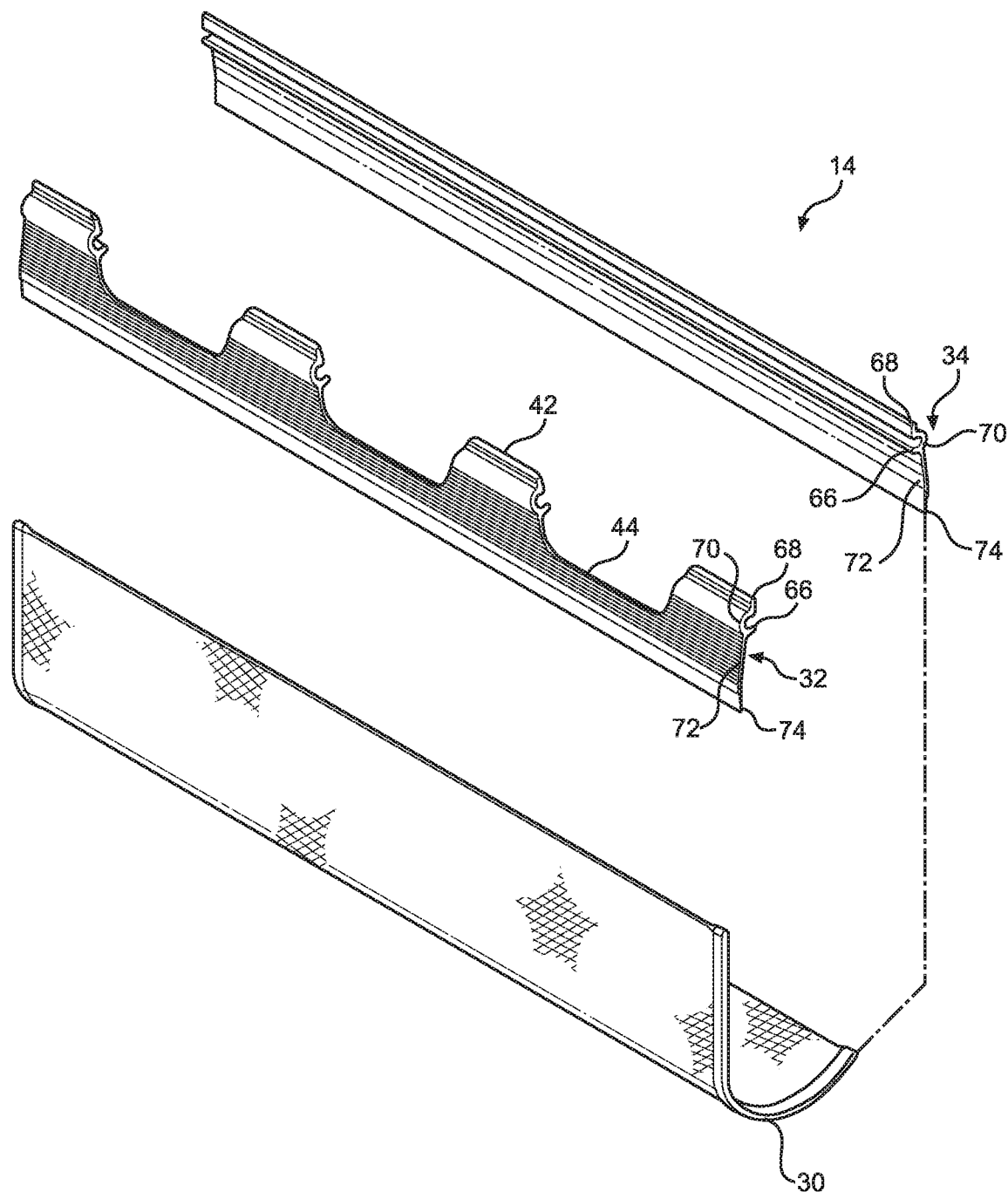
FIG. 16 is an exploded perspective view of a mesh retention tray according to the invention.

The locking channels 18 and 20 can be employed to selectively and adjustably retain a wire management cradle 14. In the depicted embodiment, as can be further understood with reference to FIG. 16, the wire management cradle 14 has a central cradle section 30, a first or outer attachment section 32, and a second or inner attachment section 34, each communicating longitudinally. The central cradle section 30 comprises a panel of flexible, stretchable material, such as a mesh or another fabric. The material of the cradle section 30 could, by way of example and not limitation, comprise a polymeric material. The cradle section 30 has first and second longitudinal edges that are secured to longitudinal distal edge portions of the first and second attachment sections 32 and 34, respectively. While it would be possible for the first and second lateral sections 32 and 34 and the central section 30 to be formed unitarily, the first and second lateral sections 32 and 34 in this embodiment are joined to the edges of the central section 30, such as by sewing as shown in FIG. 2 or in any other effective manner.

Figure 6:
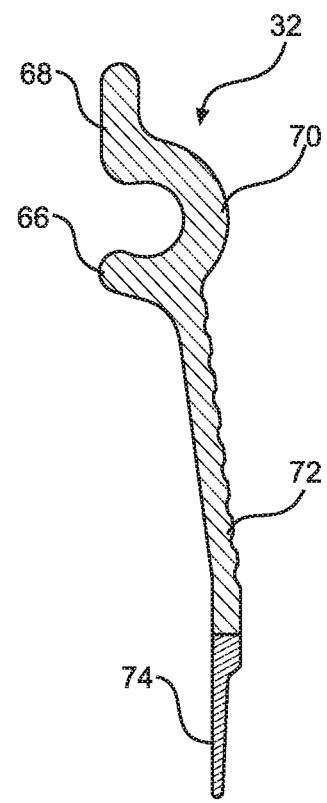
FIG. 6 is a cross-sectional view of a spline member as disclosed herein.
Figure 7:
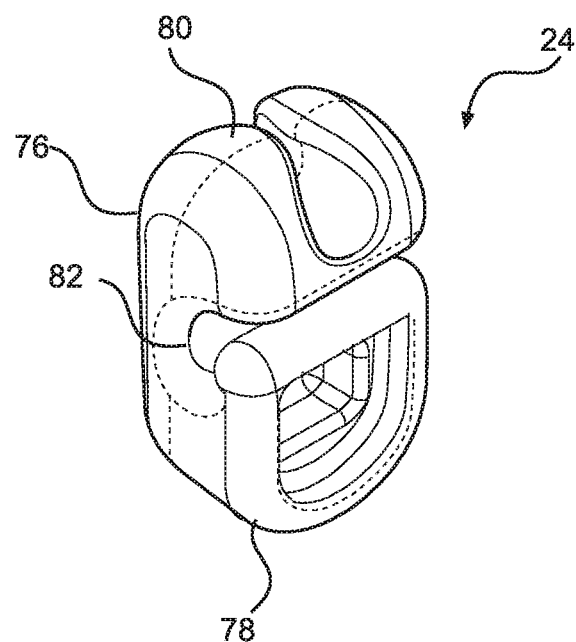
FIG. 7 is a forward perspective view of a wire management clip pursuant to the invention.
Figure 8:
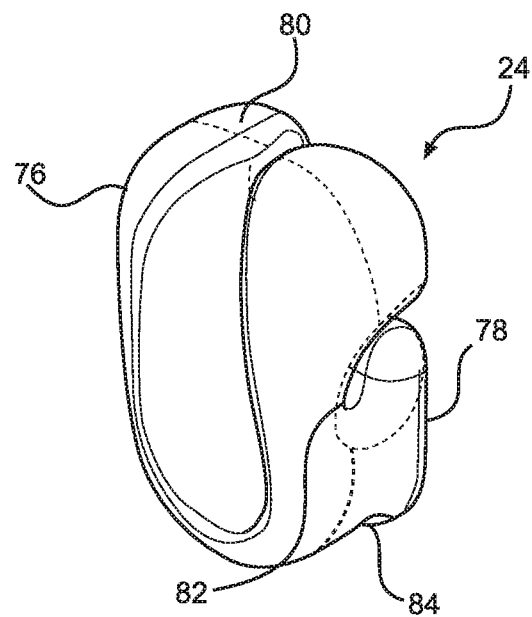
FIG. 8 is a rearward perspective view of the wire management clip.
Figure 9:
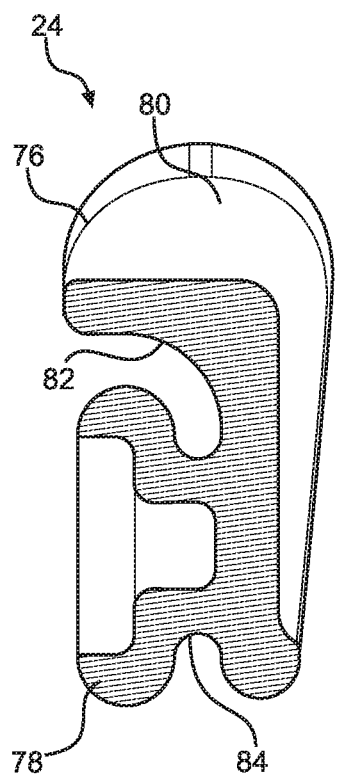
FIG. 9 is a view of the wire management clip in longitudinal cross section.
Figure 10:
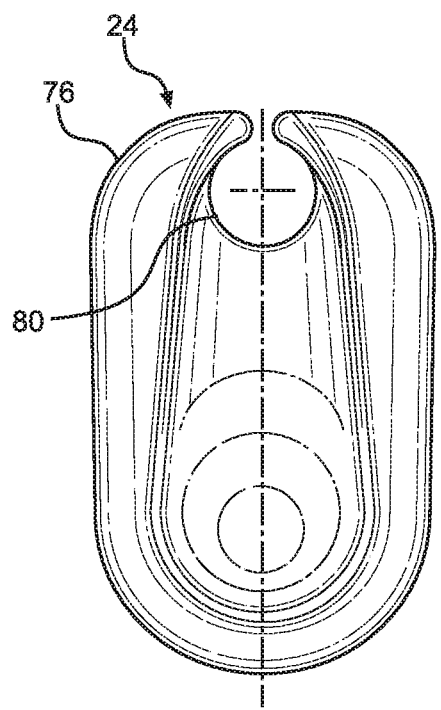
FIG. 10 is a view of the wire management clip in rear elevation.

Each of the attachment sections 32 and 34 has a proximally disposed locking formation for selectively engaging the locking channels 18 and 20 of the mounting track 12. In the present embodiment and with further reference to FIG. 6 where a cross section of the first attachment section 32 is depicted as representative in relevant part of both lateral sections 32 and 34, each attachment section 32 and 34 has a longitudinal receiving channel 70 defined by a C-shaped wall that communicates therealong for matingly receiving the locking rib 56 of a locking channel 18 or 20. The receiving channel 70 is bounded from below by a lower ridge 66 and from above by a projecting cantilever tip portion 68 that projects generally radially with respect to the receiving channel 70. A proximal spline wall 72 projects generally radially from the C-shaped wall that defines the receiving channel 70 in a direction generally opposite to the tip portion 68, and a distal spline wall 74 extends from the distal edge of the proximal spline wall 72.

Figure 18:
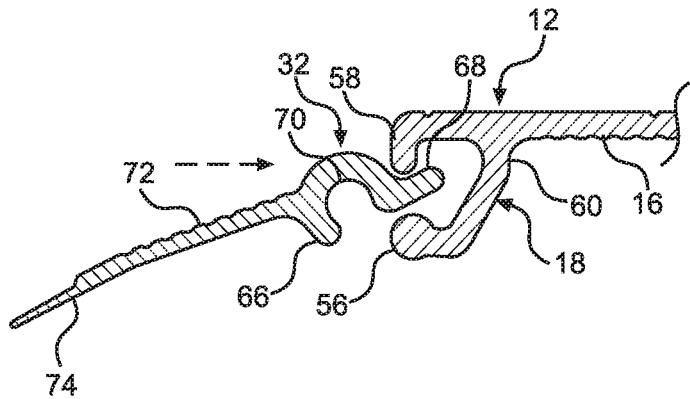
FIGS. 18, 19, and 20 are cross-sectional views depicting progressive stages of engagement between the spline member and mounting track.
Figure 19:
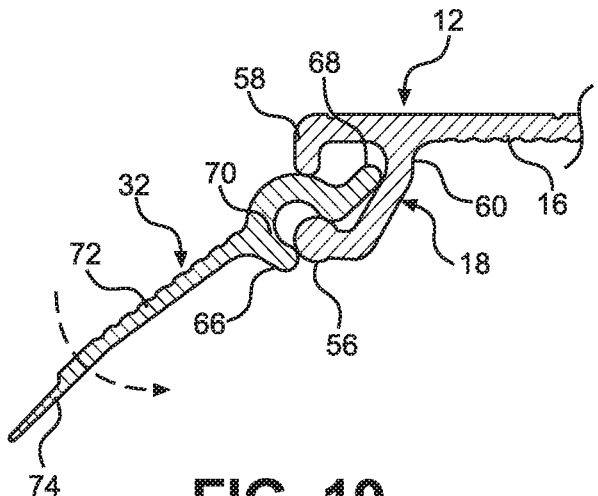
Figure 20:
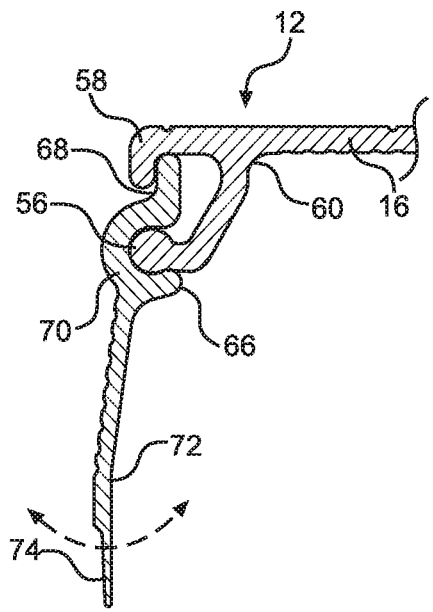

Under this construction, the attachment sections 32 and 34 can be attached to the locking channels 18 and 20 of the mounting track 12 by snapping the receiving channels 70 of the attachment sections 32 and 34 over the locking ribs 56 of the locking channels 18 and 20. As shown in the progressive views of FIGS. 18 through 20 with respect to the attachment section 32, that attachment can be carried out by first inserting the cantilever tip portion 68 of the attachment section 32 into the locking channel 18 with the attachment section 32 angled toward the mounting track 12. Then, the attachment section 32 can be pivoted downwardly and pressed toward the locking rib 56 to cause the locking rib 56 to be received into the receiving channel 70. When the attachment section 32 is pivoted to be within a given range of orthogonal to the spine 16 of the mounting track 12, the attachment section 32 will tend to be retained by the mechanical engagement of the locking rib 56 within the receiving channel 70 and by restraining contact of the cantilever tip portion 68 with the locking stop 58. The attachment section 32 can be slid longitudinally in relation to the mounting track 12 and pivoted over a given range, such as by roughly 30 degrees, while attached to the locking rib 56. When desired, the attachment sections 32 and 34 can be partially or completely detached from the mounting track 12 by reversing the process of attachment.

In potential embodiments, the lateral sections 32 and 34 are each formed unitarily, such as through an extrusion process. For instance, the attachment sections 32 and 34 could be formed from one or more polymeric materials. Still more particularly, it is contemplated that the lateral portions 32 and 34 could be formed in a co-extrusion process, such as with the receiving channel 70 and the proximal spline wall 72 formed from a first material with given material properties and the distal spline wall 74 formed from a second material of different material properties. The co-extrusion process can produce dual-durometer lateral sections 32 and 34. For instance, the first material can be high impact polyvinyl chloride chosen to demonstrate sufficient rigidity to retain the lateral sections 32 and 34 in relation to the locking channels 18 and 20 while demonstrating a degree of flexibility to permit flexion, attachment, detachment, and reconfiguration as disclosed herein. The second material can be chosen to have a softer durometer but with toughness sufficient to permit a sewing attachment to the central section 30. For example, embodiments of the lateral sections 32 and 34 can be formed from a polyvinyl chloride admixed with a thermoplastic rubber, which has been found to permit a mesh or other flexible material central section 30 to be durably sewn to the lateral sections 32 and 34.

According to the invention, either or both of the first and second attachment sections 32 and 34 can have plural cutouts or openings 44 spaced therealong in the proximal portion thereof whereby the receiving channel 70 and a proximal portion of the proximal spline wall 72 are divided into attachment segments 42. In the depicted example, the second lateral section 34 is continuous, but the first lateral section 32 is divided into plural attachment segments 42 with cutouts 44 therebetween. Each attachment segment 42 is capable of being individually attached to the respective locking channel 18.

Figure 4:
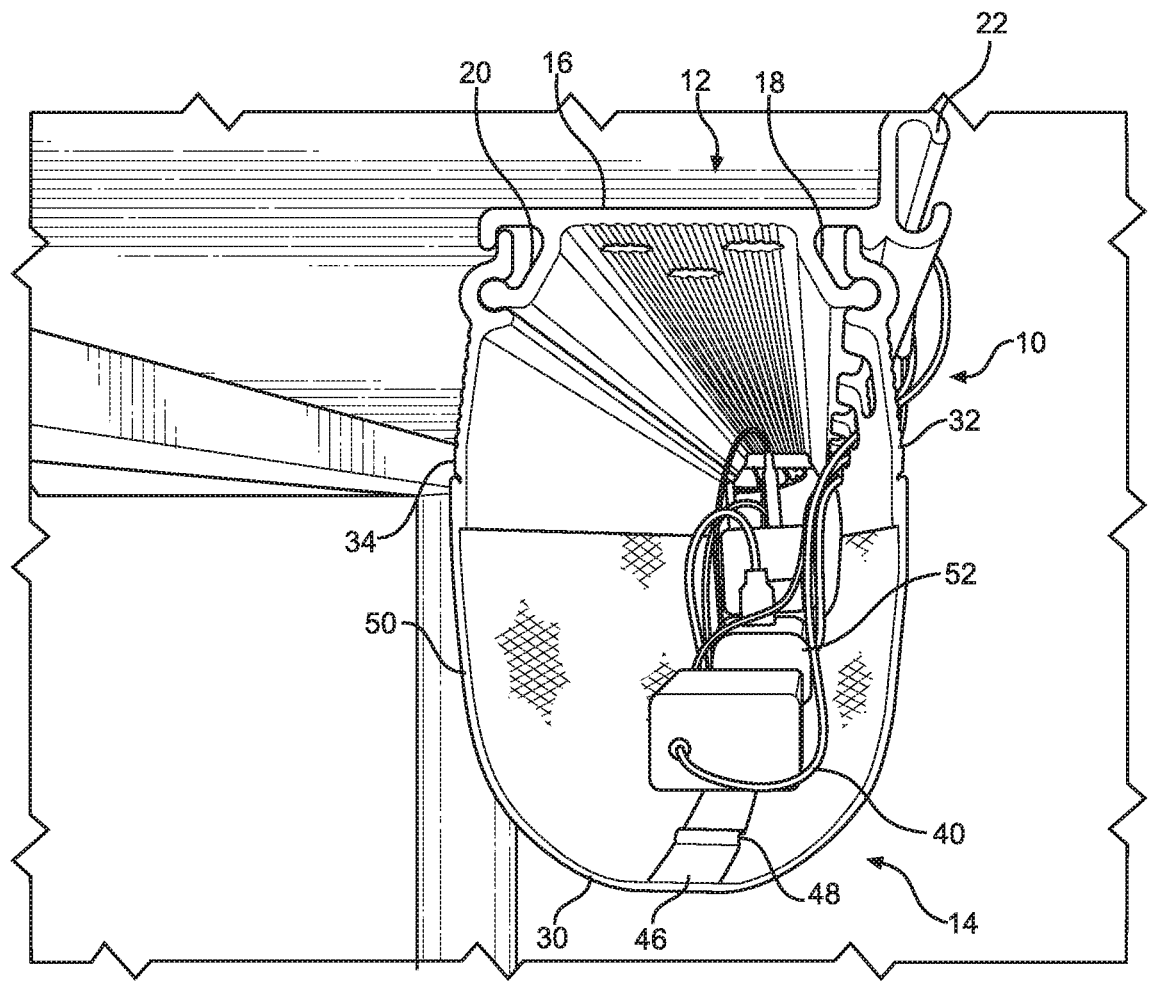
FIG. 4 is a perspective end view of the wire management system mounted to a desk work surface.
Figure 21:
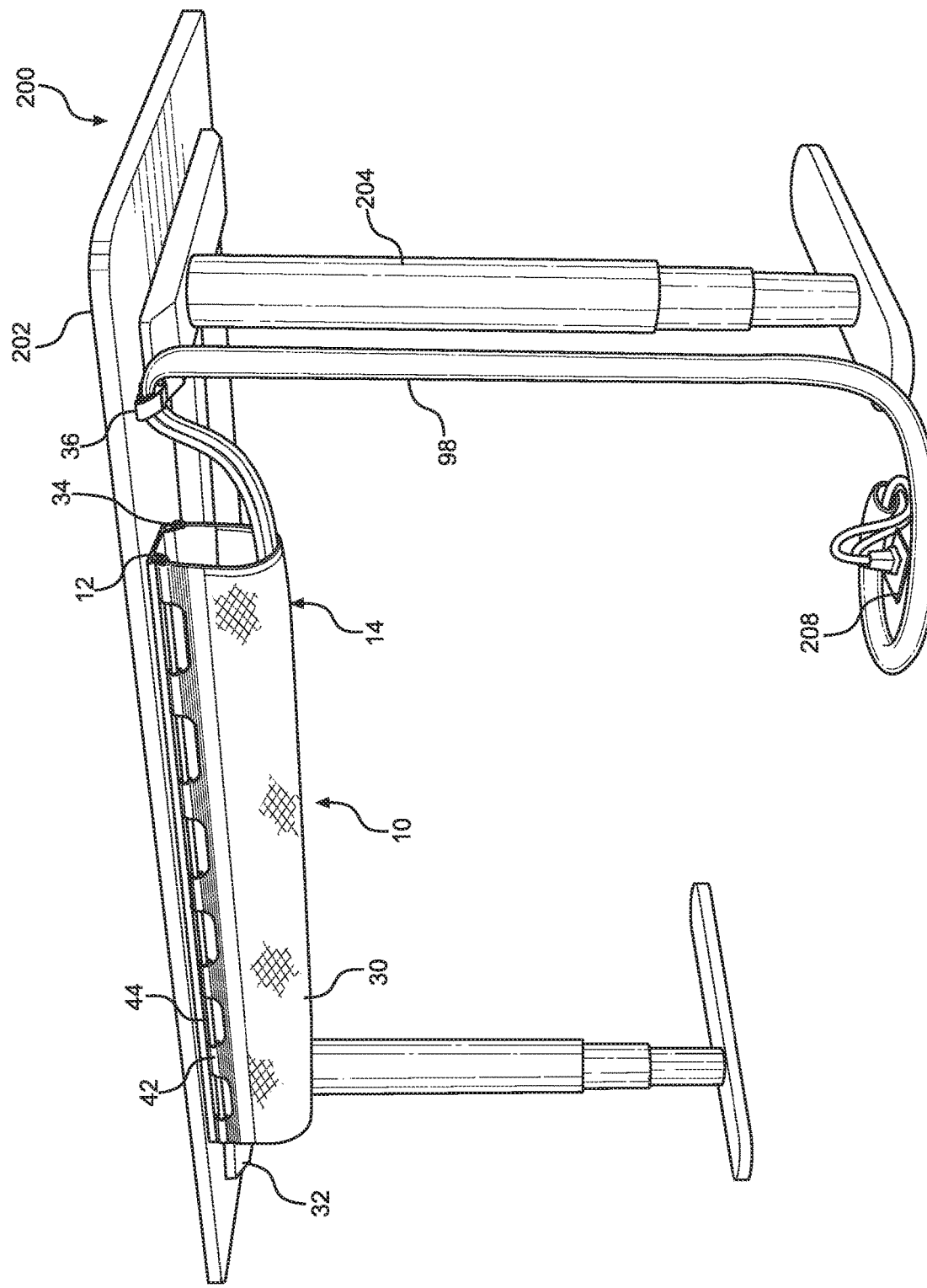
FIG. 21 is a perspective view of the wire management system mounted to a desk work surface with a cable sleeve.
Figure 22:
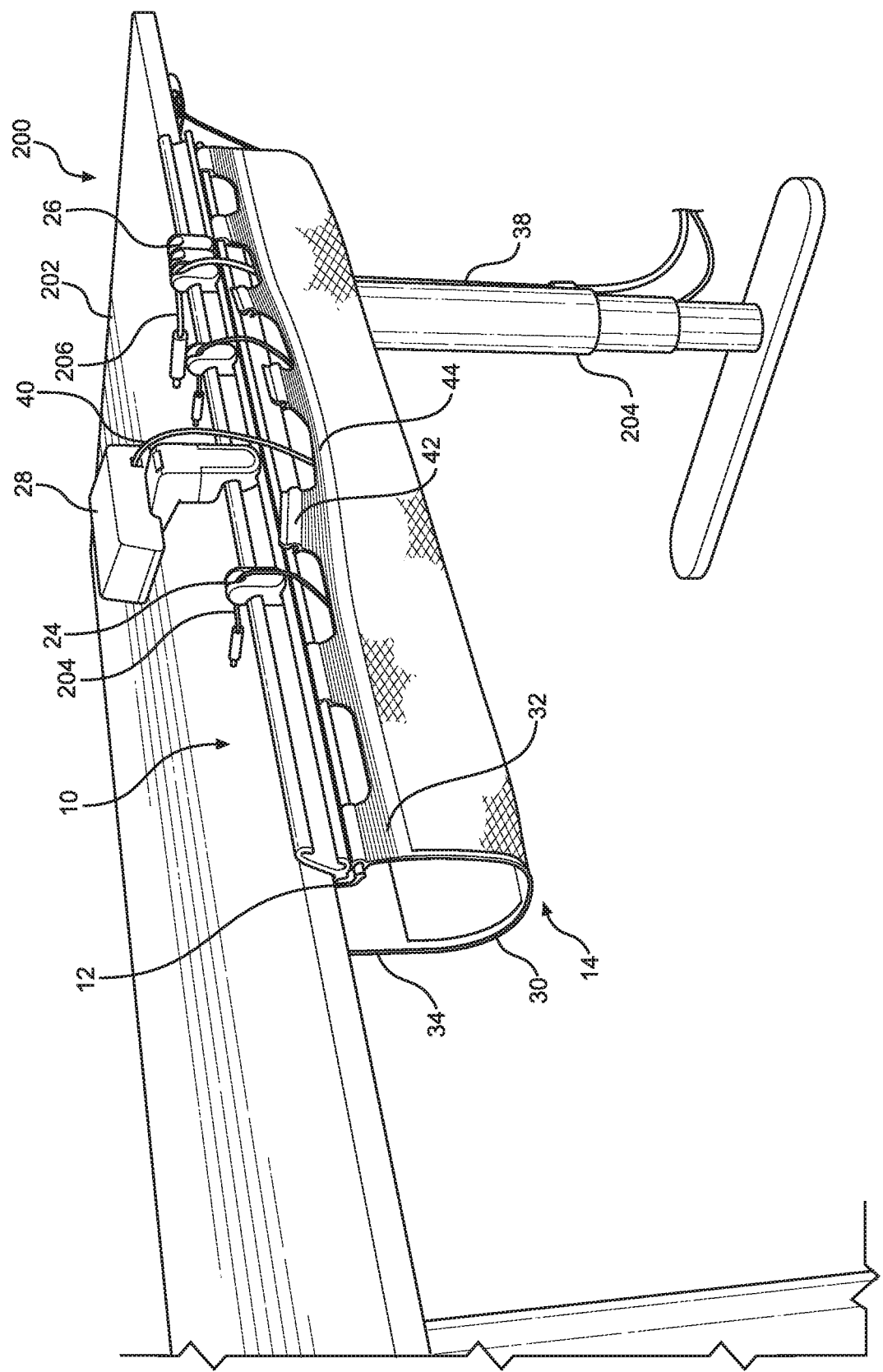
FIG. 22 is a perspective view of an embodiment of the wire management system mounted to a desk work surface with the mesh retention tray in a partially opened configuration.
Figure 28:
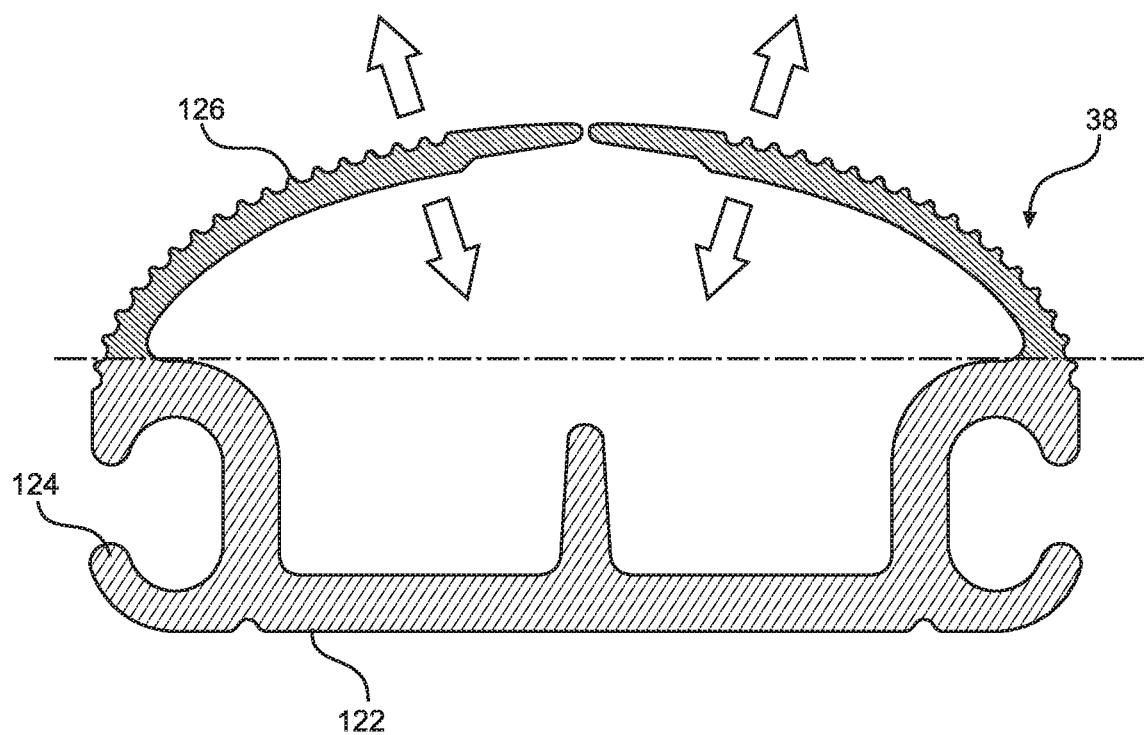
FIG. 28 is a cross-sectional view of a wire conduit as taught herein.

With this, as shown in FIGS. 1 and 4, for instance, even where the wire management cradle 14 is fully attached to the mounting track 12, power and data cables, such as those indicated at 40, 204, and 206, can be readily passed through the openings 44 over the length of the wire management system 10. The openings thus act as entrances and exits spaced along the wire management cradle 14 to permit wires 40, 204, and 206 to enter and exit the wire management cradle 14 in widely varied and readily adjustable configurations. Moreover, as in FIGS. 2 and 22, the attachment segments 42 can be selectively detached from the locking channel 18 over any given portion of the wire management system 10. Access to wires, power supplies, and other components within the wire management cradle 14 can be readily obtained to permit the addition, removal, and reconfiguration of any given wire or other component.

Where desired, some or all of the wires managed by the wire management system 10 can be disposed within a cable management sleeve 98 as in FIG. 21. There, the cable management sleeve 98 comprises a sleeve of durable, stretchable polymeric mesh. The sleeve 98 can be longitudinally opened and closed by a longitudinal connection, such as strips of hook and loop material, a zipper, or any other type of effective connection. Additionally or alternatively, wires exiting the wire management system 10 can be guided by one or more selectively positioned wire leads 36 or one or more wire conduits 38 as shown, for instance, in FIG. 1 and apart in cross section in FIG. 28. The wire conduit 38 can comprise a sleeve with a contoured base plate 122 for engaging, for instance, the legs 205 of a desk work surface 200. As depicted in FIG. 28, for example, the conduit 38 could be formed with first and second flaps 126 of bendable material, such as a shape memory material that, together with the base plate 122, define a longitudinal inner volume for receiving and guiding wires. The conduit 38 could be formed through co-extrusion technology described herein so that the base plate 122 and the C-channels 124 can demonstrate desired rigidity, such as by being formed from an impact resistant plastic, while the flaps 126 are of a high memory polymeric material, such as a plastic admixed with a thermoplastic rubber. Longitudinal C-channels 124 communicate along the edges of the base plate 122 for providing further wire retention and guidance options. End caps can selectively engage the ends of the sleeve for establishing and maintaining a closed configuration of the wire conduit 38.

Figure 24:
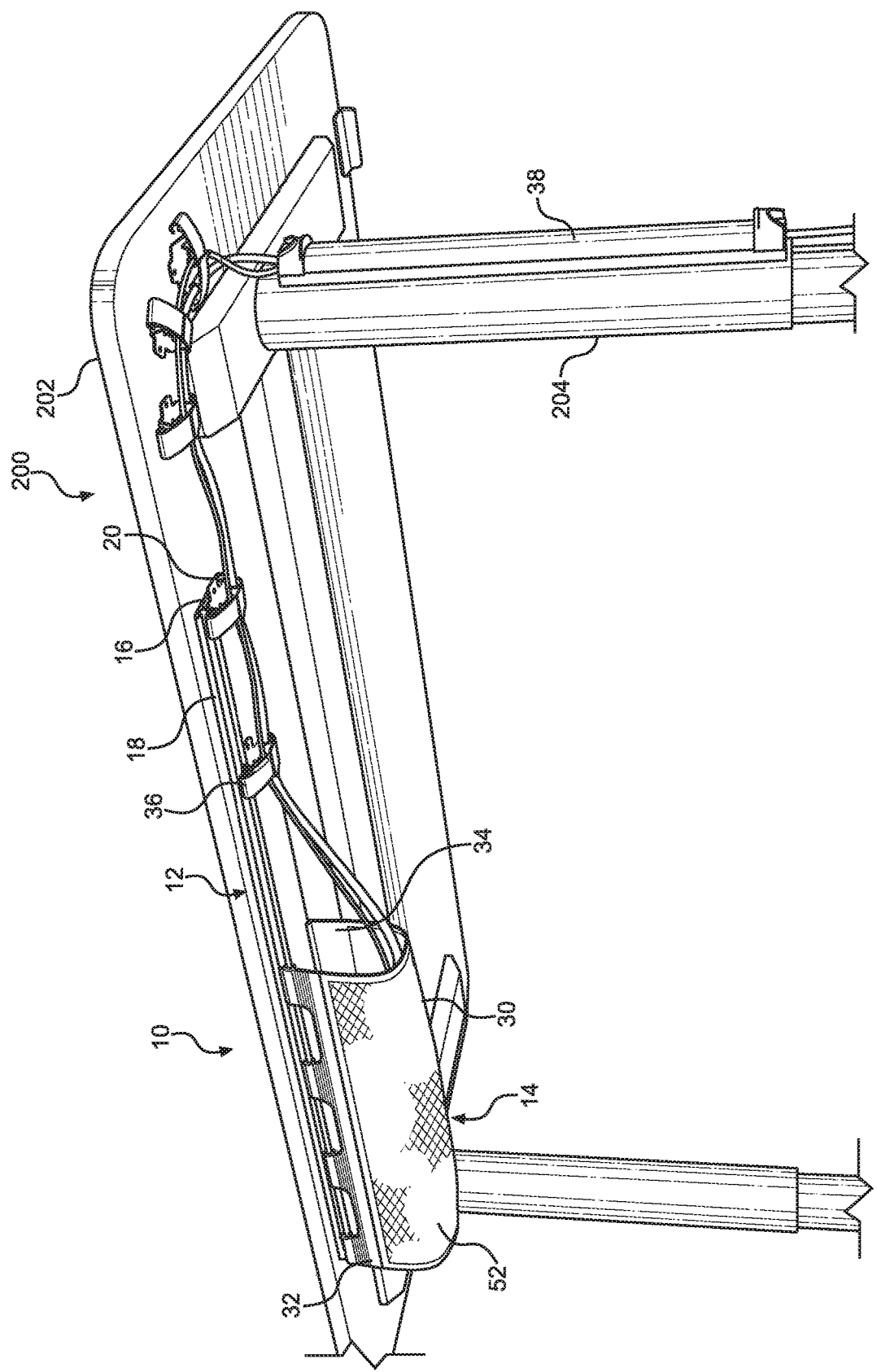
FIG. 24 is a perspective view of an alternative embodiment of the wire management system, again mounted to a desk work surface.
Figure 25:
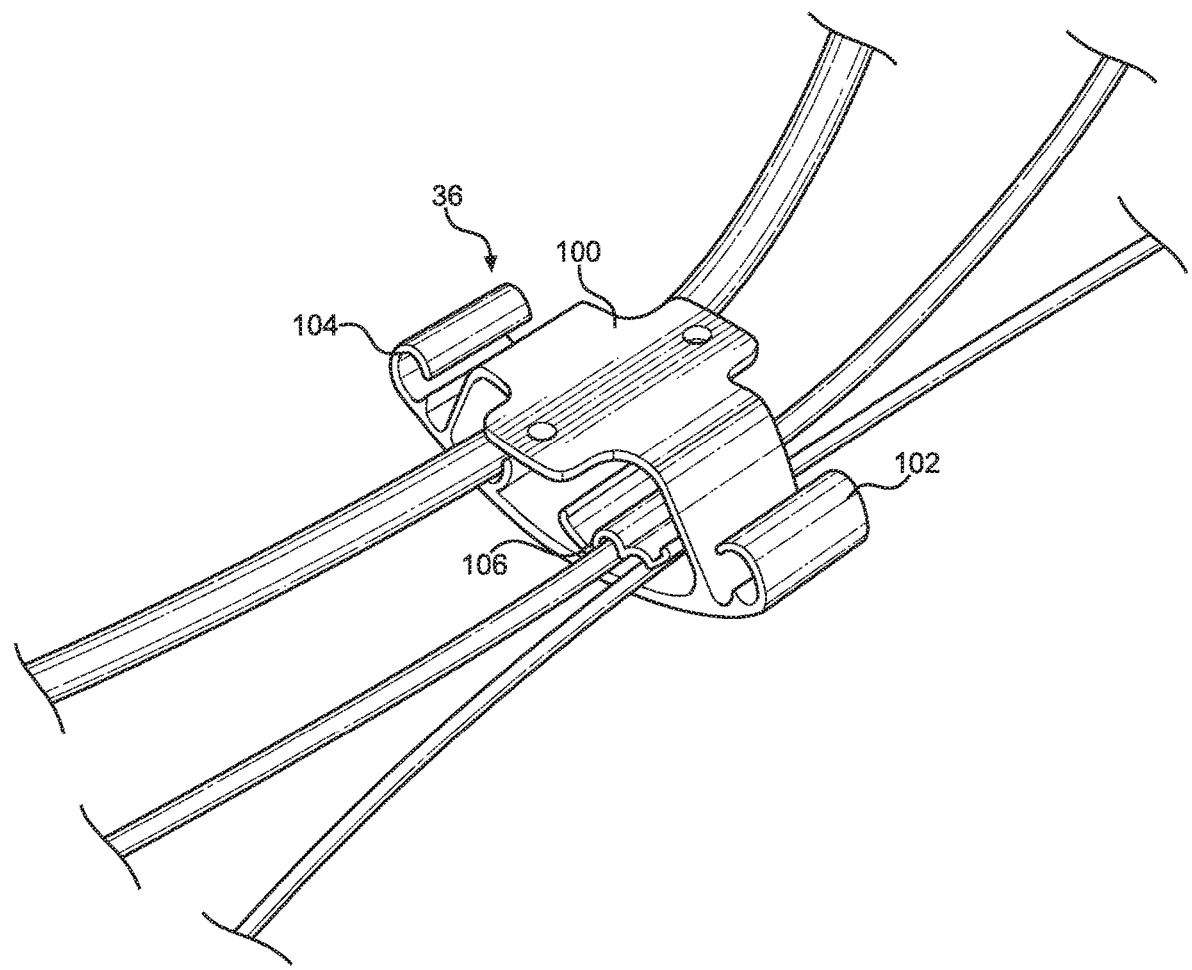
FIG. 25 is a perspective view of a wire lead pursuant to the invention.

A wire lead 36 according to an embodiment of the invention is shown apart in FIG. 25. There, the wire lead 36 can be perceived to have a main body portion 100 with a base plate for being mounted to a support surface, such as the underside of the work surface 200, and an interior bounded by an arcuate outer wall structure with first and second overlapping sections that can be selectively opened to permit the insertion and removal of wires. The interior of the wire lead 36 has one or more retention clips or other formations 106 to retain wires in a stable manner. Further, the wire lead 36 has first and second engaging formations 102 and 104 that communicate longitudinally along the wire lead 36 for engaging the locking channels 18 and 20 of the locking track 12 as shown, for instance, in the alternative embodiment of FIG. 24. The engaging formations 102 and 104 in the depicted embodiment comprise upwardly and inwardly turned hook portions that can be slid or snapped onto the locking channels 18 and 20, such as in embodiments where the locking track 12 is longer than the wire management cradle 14.

Figure 3:
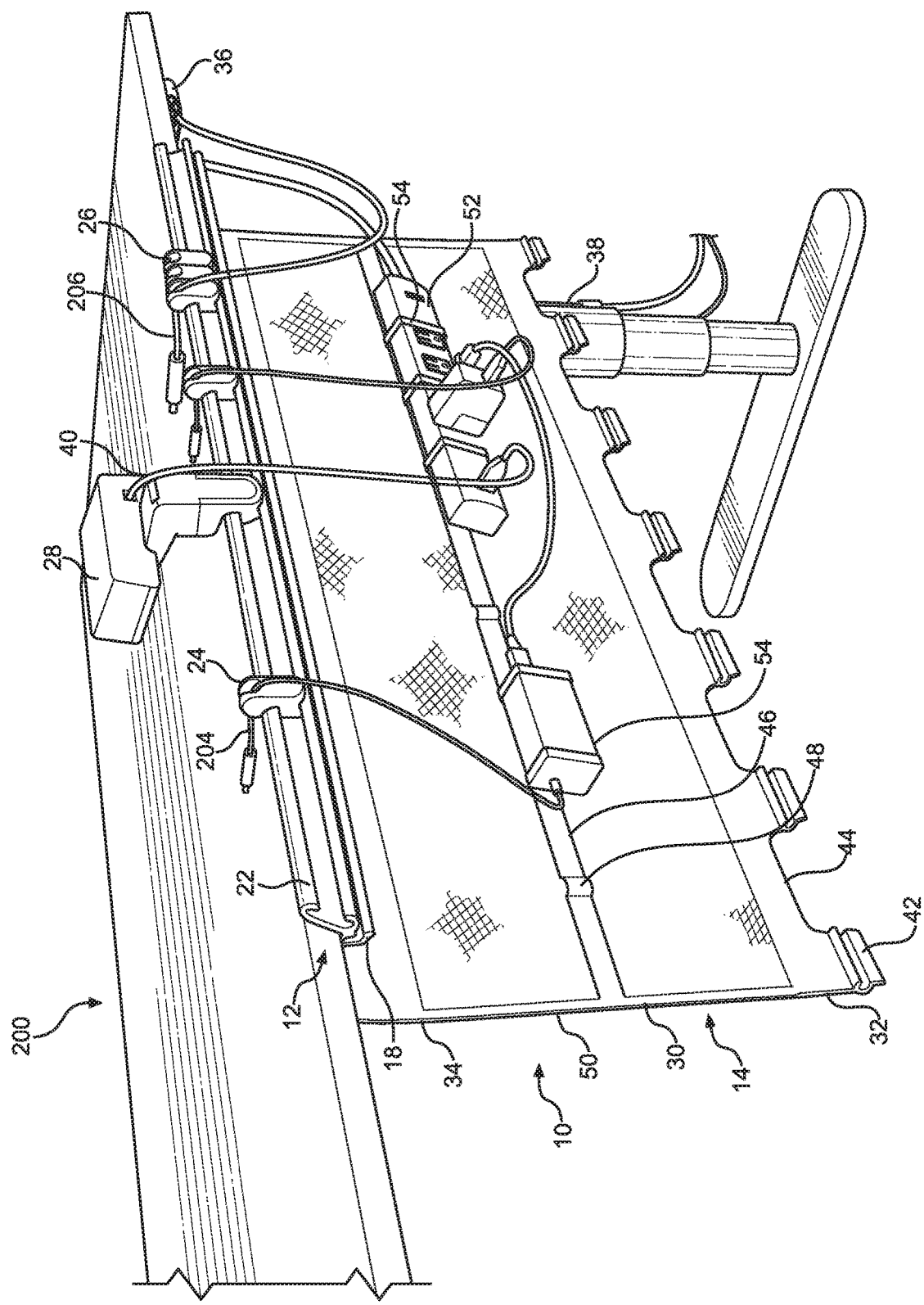
FIG. 3 is a perspective view of the wire management system in a fully opened configuration, again mounted to a desk work surface.
Figure 23:
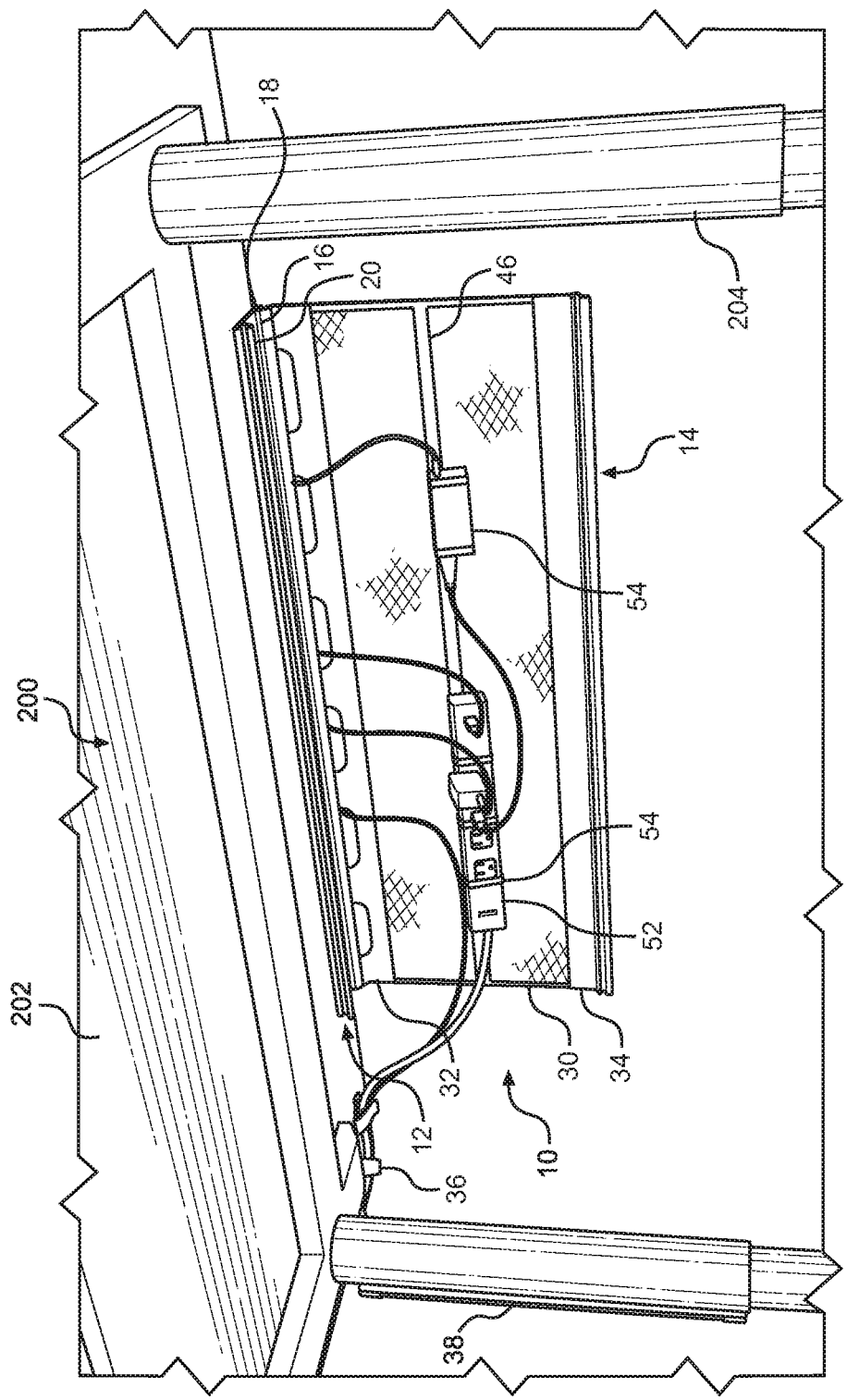
FIG. 23 is a perspective view of the wire management system in a fully opened configuration, again mounted to a desk work surface.

As in FIG. 3, for example, the entire first attachment section 32 can be detached from the mounting track 12 so that the flexible central cradle section 30 can be entirely laid open to permit access to the retained components and to the interior of the wire management system 10 from what would in this example be the rear of the work surface 200. Furthermore, as in FIG. 23, for example, the entire second attachment section 34 can alternatively be detached from the mounting track 12 so that the flexible central cradle section 30 can again be entirely laid open to permit access from what would in this example be the forward portion of the work surface 200. With that, full access to the components retained by the wire management system 10 can be readily had from either the front or the rear of the work surface 200. Where the work surface 200 can be selectively raised and lowered as in the depicted example through extendible legs 204, configuration and reconfiguration of the retained electronic components can be further facilitated.

To facilitate the retention of electronic components, an attachment strap 46 traverses longitudinally along a centerline of the cradle section 30. A plurality of retention loops 48 are spaced along the attachment strap 46 for receiving and retaining fasteners, such as but not limited to hold-down straps 54, ties, and other fastening structures. Each end of the cradle section 30 has a braided elastic reinforcement strip 50. Under this construction, electronic components, including wires, power supplies, and any other component, can be selectively secured to the cradle section 30. In FIG. 3, for instance, a power strip 52 is retained by plural retaining straps 54 so that a single power wire can enter the wire management system 10 to provide power to plural electronic devices.

The accessory rail 22 has a longitudinal retaining formation that allows for the modular retention of wires, dedicated electrical outlet structures, and other electrical components for ready, organized access from atop the work surface 200. According to embodiments of the invention, electrical retention structures have retaining formations complementary to the longitudinal retaining formation of the accessory rail 22. The electrical retention structures can, for instance, comprise wire management clips 24 and 26, power units 28, and other electrical retention structures. In the present embodiment, the complementary retaining formations permit a sliding engagement of the retention structures with the accessory rail 22 so that the type, number, and positions of the retention structures can be infinitely adjusted to suit the needs of the user.

In the present embodiment, the longitudinal retaining formation of the accessory rail 22 comprises a C-shaped, longitudinally-communicating formation with lower and upper jaws 62 and 64. Retention structures according to the invention have formations complementary to the longitudinal retaining formation to establish a secure, yet slidable engagement between them. For instance, as in FIGS. 7 through 10, wire management clips 24 according to the invention have a bulbous posterior lower body portion 78 with upper and lower laterally-communicating channels 82 and 84. The bulbous lower portions 78 of the wire management clips 24 can thus be slidably engaged with the C-shaped accessory rail 22 and positioned at any point along the rail 22. The wire management clips 24 could, for instance be snapped onto the accessory rail 22 or slid onto the rail 22 from an end portion thereof. The wire management clips 24 have upper body portions 76, and a retaining channel 80 communicates posteriorly to anteriorly through the upper body portion 76 and downwardly over the anterior portion of the wire management clip 24.

Under this construction, wires 204, such as power and communication wires, can be disposed within the retaining channels 80 of the wire management clips 24, such as by being snapped into place, so that they are adjustably retained and readily accessed in a flexible and organized manner. As shown, portions of the wires 204 pass through the retaining channels 80 while the user-connection ends of the wires 204 are accessible from atop the work surface 200 and the remainder of the wires travel into the wire management cradle 14.

Figure 11:
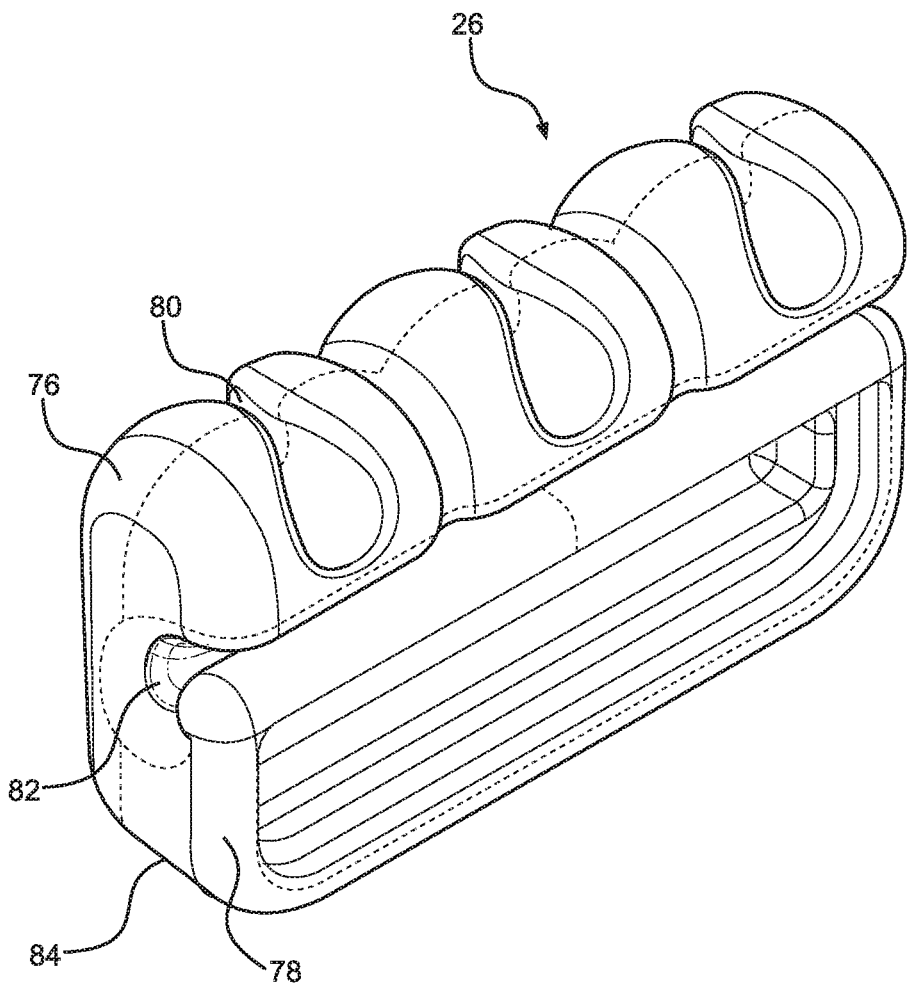
FIG. 11 is a forward perspective view of a multi-wire management clip pursuant to the invention.
Figure 12:
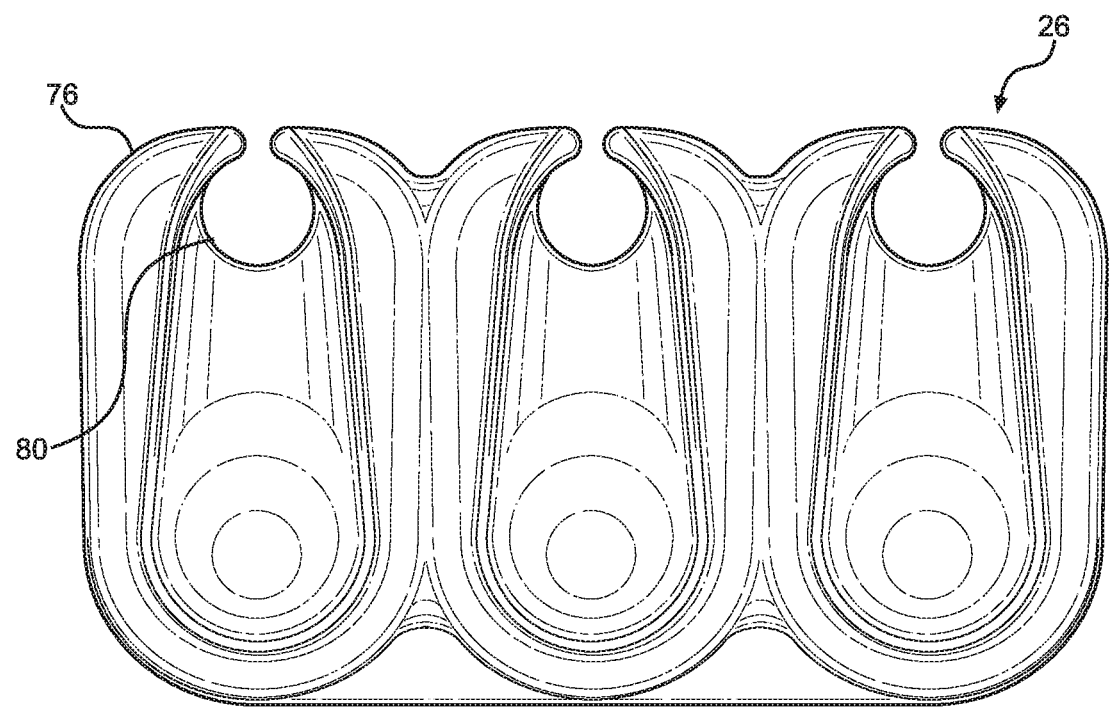
FIG. 12 is a view of the multi-wire management clip in rear elevation.
Figure 13:
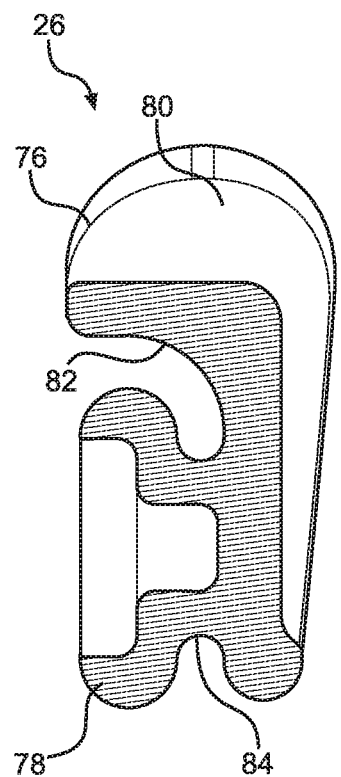
FIG. 13 is a view of the multi-wire management clip in longitudinal cross section.

As in the embodiment of FIGS. 7 through 10, wire management clips 24 according to the invention can be formed with a single retaining channel 80. However, as in FIGS. 11 through 13, for example, wire management clips 26 are contemplated with plural retaining channels 80, in this non-limiting example three, disposed in parallel within an elongate upper body portion 76 that is partially divided into three bulbous shapes. The wire management clip 26 of FIGS. 11 through 13 again has a bulbous posterior lower body portion 78, which is elongate in this embodiment, that is bounded by upper and lower laterally-communicating channels 82 and 84. With such embodiments of the wire management clip 26, plural wires can be retained in parallel for ready access from the work surface 200.

According to the invention, the wire management clips 24 can be coded, such as by color coding, for designation of given characteristics. For instance, color or other coding can be employed to indicate the type of electronic device, the type of electrical wire, or any other characteristic. In embodiments of the wire management system 10, the wire management clips 24 and 26 can be formed from a soft polyurethane material to permit ready engagement and retention of wires and a secure engagement of the clips 24 and 26 relative to the accessory rail 22.

Figure 14:
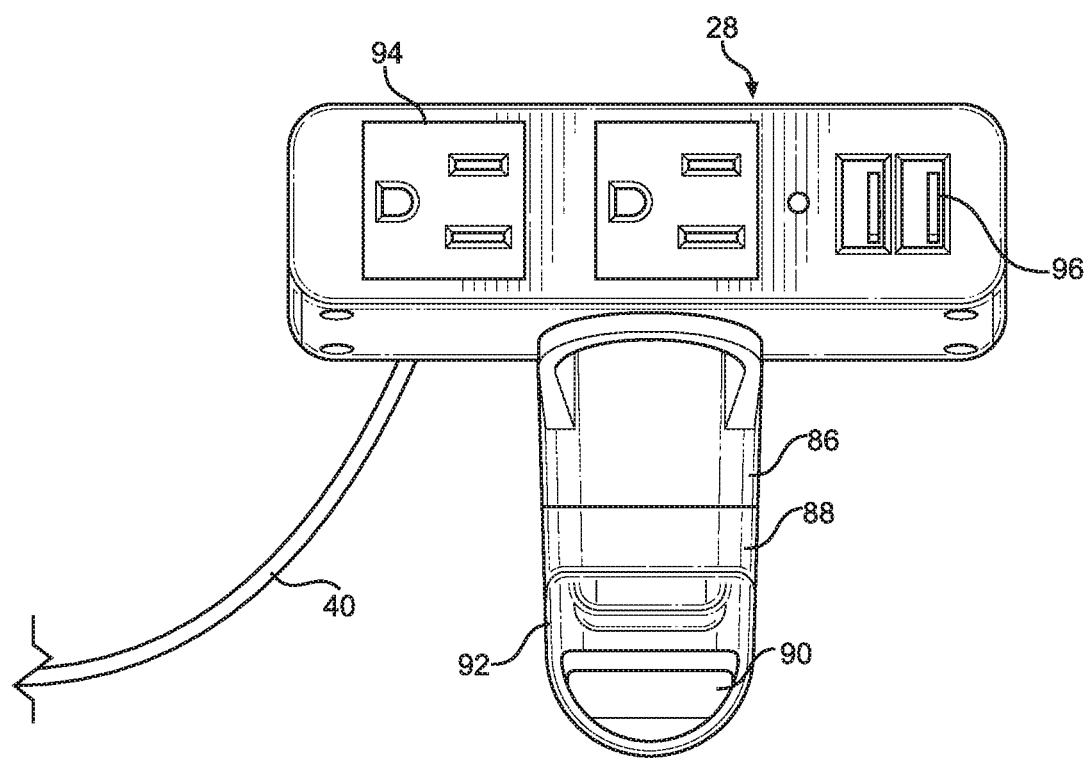
FIG. 14 is a view of a modular power and data connector as disclosed herein.
Figure 15:
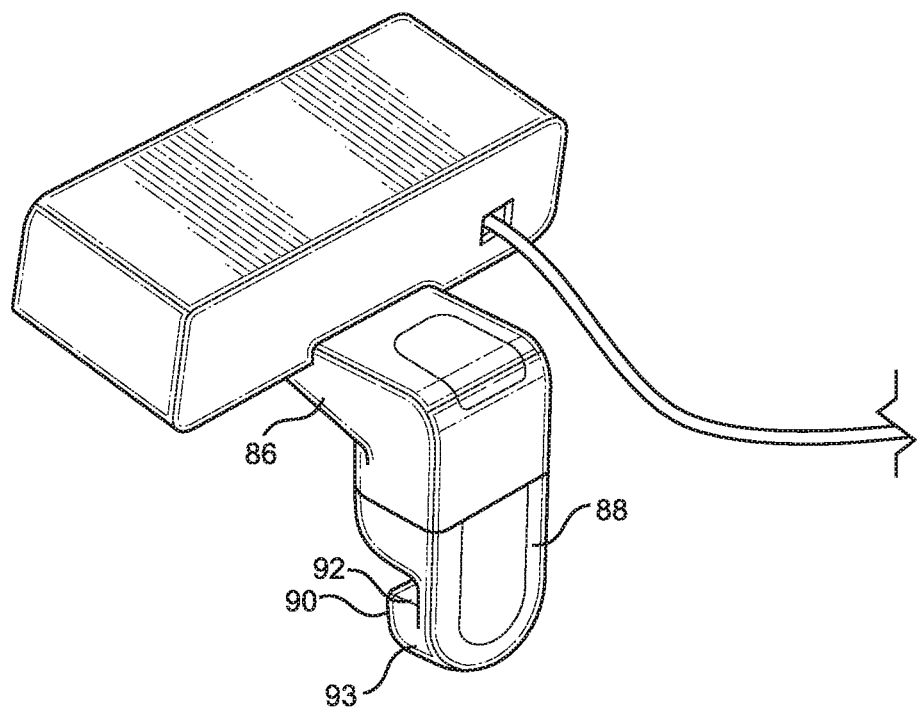
FIG. 15 is a rearward perspective view of the modular power and data connector.

The accessory rail 22 can be employed to selectively and adjustably retain plural other electronic and potentially other accessories. Such accessories can be formed with or joined to an retaining formation, such as a bulbous or other retaining formation, complementary to the retaining formation of the accessory rail 22. By way of further example and not limitation, a power unit 28 constructed according to the invention is indicated generally at 28 in FIGS. 1 through 4 and apart from the remainder of the wire management system 10 in FIGS. 14 and 15. The power and data outlet 28 has an upper portion 86 that is rotatably connected to a lower portion 88. The lower portion 88 has a bulbous retaining formation 90 bounded by upper and lower laterally-communicating channels 92 and 93 that is configured to be slidably received by the C-shaped retaining formation of the accessory rail 22. The upper portion 86 of the power unit 28, which can alternatively be referred to as a power and data outlet 28, has plural power outlets 94 and plural USB or other ports 96. The power and data outlet 28 has one or more cable connectors 40 for transmitting power and, additionally or alternatively, data in relation to the outlet 28. Here, the cable connector 40 plugs into a power strip 52 retained by the wire management cradle 14.

Figure 26:
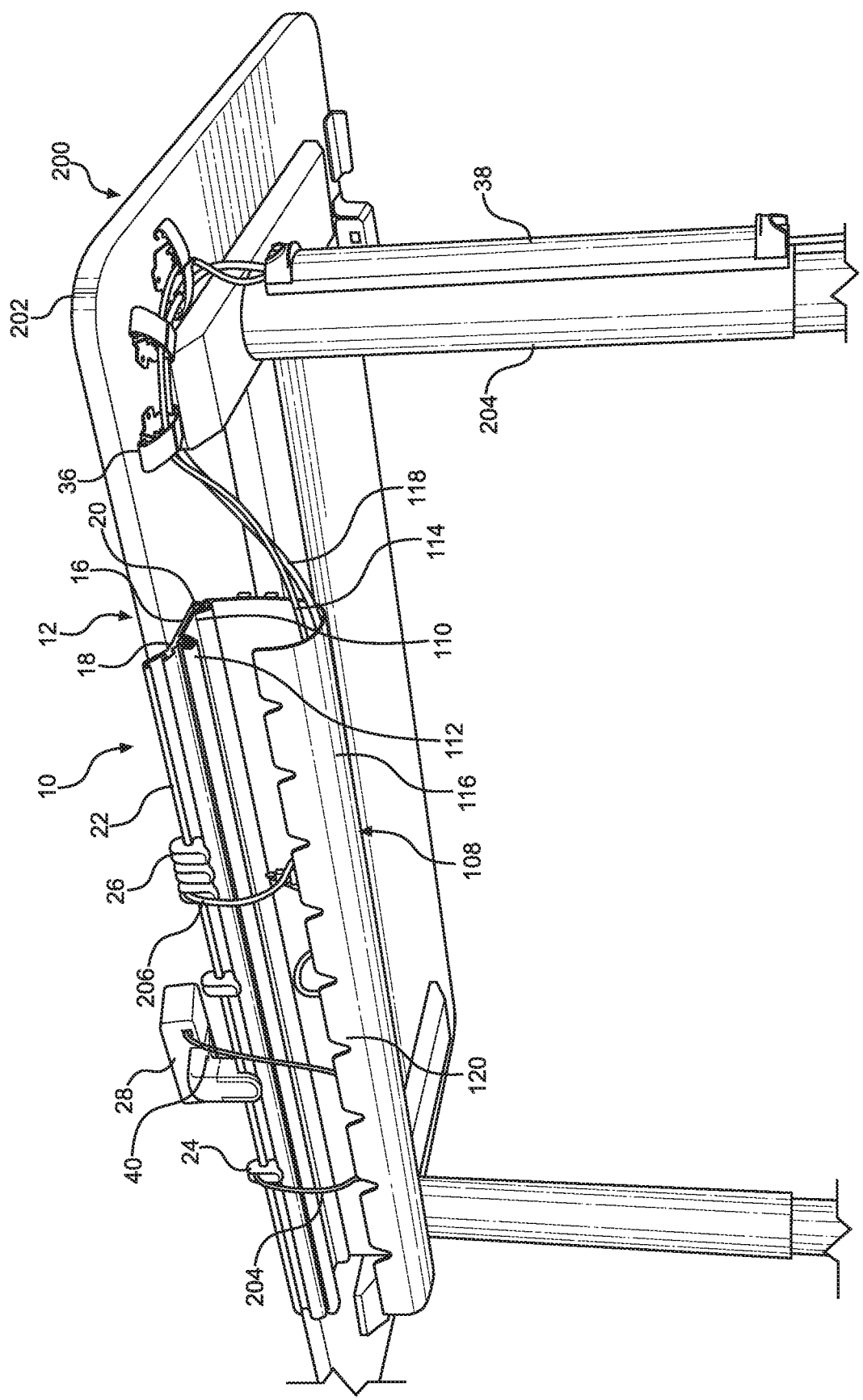
FIG. 26 is a perspective view of a further embodiment of the wire management system, again mounted to a desk work surface.
Figure 27:
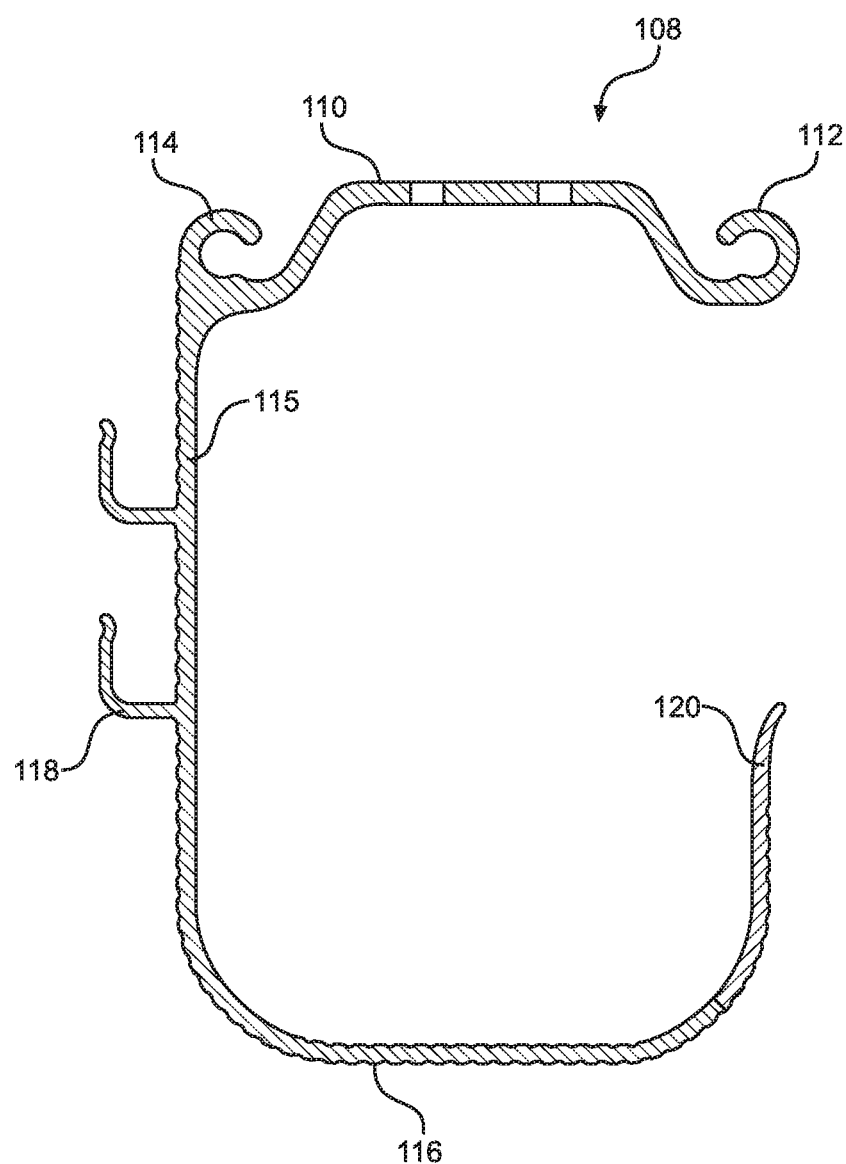
FIG. 27 is a cross-sectional view of the wire tray of the wire management system of FIG. 26.

Also according to embodiments of the invention, a wire management tray 108 could additionally or alternatively be supported by the mounting track 12 as shown in FIG. 26. The wire management tray 108 is shown in cross section in FIG. 27. The wire management tray 108 has a spine 110 for being independently mounted to a work surface or for being retained in facing juxtaposition with the spine 16 of the mounting track 12. The wire management tray 108 has first and second engaging formations 112 and 114 that communicate longitudinally alongside the spine 110 for engaging the locking channels 18 and 20 of the locking track 12 as shown, for instance, in FIG. 26. The engaging formations 112 and 114 in the illustrated embodiment comprise upwardly and inwardly turned hook portions that can be slid or snapped onto the locking channels 18 and 20. The wire management tray 108 has a rear wall 115 that projects generally perpendicularly to the spine 110, a floor 116 that projects generally perpendicularly to the rear wall 115, and a front wall 120 that can project generally perpendicularly to the floor 116 toward the spine 110. The front wall 120 can be continuous, or it could be partially or completely segmented into individually manipulated wall sections Upper and lower hook-shaped cable conduits 118 project outwardly from the rear wall 115 for enabling the further guidance and retention of wires and other articles.

In practices of the invention, the wire management tray 108 can be unitarily formed, such as through an extrusion process. It is further contemplated that the wire management tray 108 can have plural different materials coextruded to cause portions of the wire management tray 108 to have desired material properties. For instance, the spine 110, the engaging formations 112 and 114, the rear wall 115, and the floor 116 could be formed from a substantially rigid first material while the front wall 120 could be formed from a softer second material, such as a soft shape memory material. For instance, the first material can be high-impact polyvinyl chloride chosen to demonstrate sufficient rigidity to retain the general shape of the tray 108 and the engagement of the engaging formations 112 and 114 with the locking channels 18 and 20. The second material can be a high memory polymer material chosen to have a softer durometer demonstrating shape memory. For example, the front wall 120 could be formed from a polyvinyl chloride admixed with a thermoplastic rubber. With that, the front wall 120 can be selectively bent and deflected, such as to permit access to the interior of the wire management tray 108 for the configuration and reconfiguration of retained electronic components. When that configuration or reconfiguration is complete, the front wall 120 can return or be returned to its original shape to retain the electronic components within the wire management tray 108 in an orderly manner. As with the attachment sections 32 and 34 of the cradle 14, the dual extrusion technology permits sufficient rigidity where desired while providing a soft edge, which in this aspect permits convenient and comfortable access to the interior of the wire management tray 108.

Accordingly, when the attachment sections 32 of the wire management cradle 14 are attached to the mounting track 12, a strong yet flexible and breathable enclosure is defined. Wires, power supplies, outlets, actual electronic devices, and other electronic components are retained in an organized and fully adjustable manner. In view of the flexibility of the cradle section 30 even oddly shaped and oversized articles can be readily and effectively enveloped within the inner volume defined by the mounting track 12 and the wire management cradle 14. The components are efficiently and securely retained while the heat given off by the same is readily dissipated. The wire management cradle 14, the wire management clips 24 and 26, the wire leads 36, and other components of the wire management system 10 can be readily attached, detached, repositioned, and reconfigured without the need for specialized tools.

It has been appreciated by the inventor that the strategic use of materials can aid in the necessary heat management for the electronic articles retained and managed. For instance, aluminum can be employed for portions of the wire management system 10, such as all or part of the elongate mounting track 12, so that heat can be dissipated through the high thermal conductivity of aluminum. Furthermore, the use of mesh for all or portions of the wire management cradle 14 can likewise facilitate heat venting while also providing flexibility in the retention and management of electronic wires and connectors.

With certain details and embodiments of the present invention for wire management systems and methods disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments. The invention shall not be limited with respect to any dimensions, relative size relationships, notations, or particular configurations shown or described herein except as expressly required by the claims.

Therefore, the following claims are intended to define the scope of protection to be afforded to the inventor. Those claims shall be deemed to include equivalent constructions insofar as they do not depart from the spirit and scope of the invention. It must be further noted that one or more of the following claims could express certain elements as means for performing a specific function, at times without the recital of structure or material. As the law demands, any such claims shall be construed to cover not only the structure and material expressly described in this specification but also all legal equivalents thereof.

I claim as deserving the protection of Letters Patent:

1. A wire management system for managing electronic wiring in relation to a structure, the wire management system comprising:
   an elongate mounting track for being mounted to the structure wherein the mounting track has a spine and first and second longitudinal locking formations; and
   a wire management cradle with a central cradle section and first and second longitudinal locking formations for being selectively attached to the first and second longitudinal locking formations of the mounting track;
   wherein each of the first and second locking formations of one of the mounting track and the wire management cradle comprises a longitudinal locking rib and wherein each of the first and second locking formations of the other of the mounting track and the wire management cradle comprises a longitudinal receiving channel for receiving the longitudinal locking rib and wherein each of the first and second locking formations comprising a locking rib further comprises a locking stop that traverses longitudinally in spaced relation to the locking rib;
   whereby the wire management cradle can be selectively attached to the elongate mounting track to define an enclosure for electronic wiring.

2. The wire management system of claim 1 wherein the locking ribs are retained by longitudinal retaining walls that project from the spine of the mounting track, wherein the locking stops project from the spine spaced from the retaining walls, wherein locking channels are defined within areas between the retaining walls, the spine, the locking stops, and the locking ribs, and wherein the receiving channels are retained by the wire management cradle.

3. The wire management system of claim 2 further comprising a longitudinal cantilever tip portion that projects from the receiving channel whereby the longitudinal cantilever tip portion can be received into the locking channel.

4. The wire management system of claim 1 wherein the central cradle section comprises a panel of flexible material.

5. The wire management system of claim 4 wherein the central cradle section comprises a panel of mesh.

6. A wire management system for managing electronic wiring in relation to a structure, the wire management system comprising:
   an elongate mounting track for being mounted to the structure wherein the mounting track has a spine and first and second longitudinal locking formations; and
   a wire management cradle with a central cradle section and first and second longitudinal locking formations for being selectively attached to the first and second longitudinal locking formations of the mounting track and wherein the central cradle section comprises a panel of flexible mesh material wherein the central cradle section has first and second longitudinal edges, wherein the wire management cradle further comprises first and second attachment sections, wherein the first attachment section is secured to the central cradle section along the first longitudinal edge thereof, wherein the second attachment section is secured to the central cradle section along the second longitudinal edge thereof, and wherein the first and second locking formations are retained by the first and second attachment sections;
   whereby the wire management cradle can be selectively attached to the elongate mounting track to define an enclosure for electronic wiring.

7. The wire management system of claim 6 wherein each of the first and second locking formations of one of the mounting track and the wire management cradle comprises a longitudinal locking rib and wherein each of the first and second locking formations of the other of the mounting track and the wire management cradle comprises a longitudinal receiving channel for receiving the longitudinal locking rib.

8. The wire management system of claim 7 wherein the wherein each of the first and second locking formations of the mounting track comprises a longitudinal locking rib and wherein each of the first and second locking formations of the wire management cradle comprises a longitudinal receiving channel for receiving the longitudinal locking rib.

9. The wire management system of claim 6 wherein each of the first and second attachment sections has a proximal spline wall that projects from the locking formation and a distal spline wall that extends the proximal spline wall wherein the proximal spline wall and the distal spline walls have different material properties.

10. The wire management system of claim 9 wherein the proximal spline wall and the distal spline wall are formed through co-extrusion of a first material and a second, different material.

11. The wire management system of claim 6 wherein at least one of the first and second attachment sections has plural spaced openings.

12. The wire management system of claim 11 wherein the first and second attachment sections comprises a spline wall with the first and second locking formations retained along a proximal edge of the spline wall and wherein the locking formation and at least a portion of the spline wall of at least one of the attachment sections are divided into plural segments.

13. The wire management system of claim 6 further comprising an accessory rail retained by the mounting track wherein the accessory rail has a longitudinal retaining formation for selectively retaining accessories with corresponding retaining formations.

14. The wire management system of claim 13 wherein the spine has an upper surface and a lower surface, wherein the first and second longitudinal locking formations project from the lower surface of the spine, and wherein the accessory rail is upturned in relation to the upper surface of the spine.

15. A wire management system for managing electronic wiring in relation to a structure, the wire management system comprising:
   an elongate mounting track for being mounted to the structure wherein the mounting track has a spine and first and second longitudinal locking formations; and
   a wire management cradle with a central cradle section and first and second longitudinal locking formations for being selectively attached to the first and second longitudinal locking formations of the mounting track;
   an accessory rail retained by the mounting track wherein the accessory rail has a longitudinal retaining formation for selectively retaining accessories with corresponding retaining formations;
   wherein the spine has an upper surface and a lower surface, wherein the first and second longitudinal locking formations project from the lower surface of the spine, and wherein the accessory rail is upturned in relation to the upper surface of the spine;
   a wire management clip wherein the wire management clip has a retaining formation corresponding in shape to the shape of the retaining formation of the accessory rail;

whereby the wire management cradle can be selectively attached to the elongate mounting track to define an enclosure for electronic wiring.

16. The wire management system of claim 15 wherein the longitudinal retaining formation of the accessory rail comprises a C-shaped formation and wherein the retaining formation of the wire management clip comprises a portion bounded by upper and lower laterally-communicating channels for engaging the C-shaped formation of the accessory rail.

17. The wire management system of claim 15 wherein the wire management clip further has a retaining channel for receiving and retaining a wire.

18. The wire management system of claim 17 wherein the wire management clip has plural retaining channels for receiving and retaining plural wires.

19. The wire management system of claim 13 further comprising a power unit wherein the power unit has a retaining formation corresponding in shape to the shape of the retaining formation of the accessory rail wherein the power unit has at least one electrical outlet.

20. The wire management system of claim 1 further comprising a wire management tray with first and second longitudinal engaging formations for being selectively engaged with the first and second longitudinal locking formations of the mounting track wherein the wire management tray has a first wall of a first material and a second wall of a second material wherein the second material comprises a shape memory material.

\* \* \* \* \*